(12) United States Patent  
Moroda

(10) Patent No.: US 6,343,378 B1
(45) Date of Patent: Jan. 29, 2002

(54) METHOD OF MAKING LINK DIRECTIVE FILE AND TOOL FOR MAKING LINK DIRECTIVE FILE

(75) Inventor: Takahiro Moroda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/277,775

(22) Filed: Mar. 29, 1999

(30) Foreign Application Priority Data

Mar. 27, 1998 (JP) .......................................... 10-080898

(51) Int. Cl.[7] .................................................. G06F 9/44
(52) U.S. Cl. .................................. 717/10; 717/4; 717/5
(58) Field of Search ..................... 717/10, 4, 5; 710/204

(56) References Cited

U.S. PATENT DOCUMENTS

| 5,193,191 | A | * | 3/1993 | Mckeeman et al. | ......... 395/700 |
| 5,367,621 | A | * | 11/1994 | Cohen et al. | ................ 395/154 |
| 5,560,012 | A | * | 9/1996 | Ryu et al. | .................... 395/700 |
| 5,664,129 | A | | 9/1997 | Futatsugi et al. | |
| 6,202,199 | B1 | * | 7/1998 | Wygodny et al. | ............... 717/4 |
| 5,933,642 | A | * | 8/1999 | Greenbaum et al. | ......... 395/709 |

FOREIGN PATENT DOCUMENTS

| GB | 2316592 | 2/1998 |
| JP | 11-95987 | 4/1999 |

* cited by examiner

Primary Examiner—Mark R. Powell
Assistant Examiner—Chuck Kendall
(74) Attorney, Agent, or Firm—Foley & Lardner

(57) ABSTRACT

A method of making a link directive file, the file being used for link processing where a plurality of object files are linked into an execute form file and disposing instruction codes and variable data in a memory space, the method comprising the steps of visually displaying the aforesaid link directive file as a memory image. A tool for making a link directive file, the file being used for link processing where a plurality of object files are linked into an execute form file and disposing instruction codes and variable data in a memory space, the tool comprising: memory disposition information storage means for storing memory disposition information including at least address size information concerning each individual device; link directive data holding means for holding link directive file data that instructs a position where constituent elements of the aforesaid objective file are disposed in an execute form file; memory image display means for displaying a memory image based upon the aforesaid memory information held in the aforesaid memory disposition information storage means and said link directive data held in said link directive data holding means; and data edit means for altering contents of information of a part on the memory image which part is needed to be altered with reference to the aforesaid memory image and hereby updating the memory image and link directive data.

15 Claims, 16 Drawing Sheets

```
L1      const int a = 1;
L2      int b;
L3      int c = 0;
L4      void main()
L5      {
L6         int d;
L7         d = b + c + 10;
L8      }

```
L01             .sdata
L02             .align  4
L03             .globl  _c, 4
L04     -c:
L05             .word   0x0
L06             .sbss
L07             .comm   _b, 4, 4
L08             .const
L09             .align  4
L10             .globl  _a, 4
L11     -a:
L12             .word   0x1
L13             .text
L14             .align  4
L15             .frame  _main, .S5
L16             .globl  main
L17     -main:
L18             jbr     .L4
L19     .L5:
L20             ld.w    $_b,  r10
L21             ld.w    $_c,  r11
L22             add     r11,  r10
L23             add     10,   r10
L24             st.w    r10,  -4+.A5[sp]
L25             ld.w    -4+.F5[sp],  lp
L26             add     .S5,  sp
L27             jmp     [lp]         --0
L28     .L4:
L29             add     -.S5,  sp
L30             st.w    lp,   -4+.F5[sp]
L31             jbr     .L5
L32             .set    .S5,  0x8
L33             .set    .F5,  0x8
L34             .set    .A5,  0x4

```
LD01    SCONST : !LOAD ?R {
LD02    .sconst = $PROGBITS ?A .sconst;
LD03    };
LD04    TEXT : !LOAD ?RX {
LD05    .text = $PROGBITS ?AX;
LD06    };
LD07    DATA : !LOAD ?RW V0x100000 {
LD08    .data = $PROGBITS ?AW;
LD09    .sdata = $PROGBITS ?AWG;
LD10    .sbss = $NOBITS ?AWG;
LD11    .bss = $NOBITS ?AW;
LD12    };
LD13    CONST : !LOAD ?R {
LD14    .const = $PROGBITS ?A .const;
LD15    };
LD16    SEDATA : !LOAD ?RW V0xff6000 {
LD17    .sedata = $PROGBITS ?AW .sedata;
LD18    .sebss = $NOBITS ?AW .sebss;
LD19    };
LD20    SIDATA : !LOAD ?RW V0xffe000 {
LD21    .tidata.byte = $PROGBITS ?AW .tidata.byte;
LD22    .tidata.word = $PROGBITS ?AW .tidata.word;
LD23    .tidata = $PROGBITS ?AW .tidata;
LD24    .sidata = $PROGBITS ?AW .sidata;
LD25    };
LD26    __tp_TEXT @ %TP_SYMBOL;
LD27    __gp_DATA @ %GP_SYMBOL &__tp_TEXT{DATA};
LD28    __ep_TEXT @ %EP_SYMBOL;
```

METHOD OF MAKING LINK DIRECTIVE FILE AND TOOL FOR MAKING LINK DIRECTIVE FILE

BACKGROUND OF THE INVENTION

1. Field of the Invention

The present invention relates to a method of making a link directive file, and a tool for making the link directive file, and more specifically to a method of making and updating a link directive file used for a link processing when a compiler converts a source file to an execute type file for storing directive data being memory disposition instruction information of an instruction code and variable data, and to a tool used for realizing the aforesaid method.

2. Description of the Related Art

Upon developing a program for a microcomputer a programmer performs a number of works of previously making a source file with a predetermined language, and then converting with the aid of a compiler the source file to a file (execute form) of the form which is read and executed by the microcomputer. The works are performed by the programmer who assembles a microcomputer in a desired electronic device (hereinafter referred to a target system.), and the program of the execute type file is written into a ROM (Read Only Memory). The microcomputer executes the program by reading instruction codes and variable data written in the ROM.

Recently, microcomputers have wide applications and hence sizes of programs are increased. When a new program is developed, the program is divided into a plurality of blocks, and a plurality of programmers prepare a source file for each block. These blocks are finally collected (hereinafter referred to link.) into one completed program. A processing routine frequently used in such a program is defined in a library as a function and a macro, whereby a programmer can actually makes a source file. Such a library is also linked in a final stage. Several thousand types of microcomputers are known in the world, and a programmer can select an optimum microcomputer in conformity with his application.

However, it is impossible that since instruction codes executed by microcomputers are different depending upon the types of the microcomputers, a programmer memorizes instruction codes of each type of the microcomputers. Further, it is uneconomical to prepare a program developing device for microcomputers for each type of microcomputers. For this, a programmer makes a source file in a predetermined language to which the programmer is familiar, and converts the source file to an execute form file corresponding to each type of the microcomputers using a program developing device and a conversion program supplied by a microcomputer maker. The programmer deal with various microcomputers using a program developing device by setting to the program developing device software required for program development such as a compiler, an assembler, and a linker, and inherent information for each type of microcomputers such as a device file and a link directive file (hereinafter referred to LDF).

FIG. 15 is a block diagram schematically illustrating the construction of a prior art program developing device. As illustrated in the same figure, the prior art program developing device comprises an LDF making section 73, a program making/processing section 74, an LDF 53, and a device file 61. The LDF 53 includes link directive data (hereinafter referred to LDF data) being an instruction document when a link processing is executed. The LDF making section 73 comprises a text making tool 56, a display 59, and input means 62. The programmer 51 prepares the LDF data required for the link processing while referring to a manual 52a of the microcomputer and a manual 52b of a linker 54, and stores the data in the LDF53. The program making/processing section 74 comprises a compiler 57 and a linker, in which source files 55a to 55c are converted into object files 58a to 58c, which object files are integrated into one through the linker 54 to make an execute form file 60. The compiler 57, when converting the source files 55a to 55c to the object files 58a to 58c, refers to the device file 61 specific to each microcomputer to perform a conversion processing corresponding to each microcomputer. The linker 54 likewise refers to the device file 61 for a link processing. In the following, there will be exemplarily illustrated a program development procedure in which after the source file is made, it is converted to the execute form file.

As illustrated in FIG. 15, the three source files 55a to 55c are first converted to the execute form file 60. Thereupon, in the intermediate stage compiler 57 the source files 55a to 55c are converted to the object files 58a to 58c after passage through the assembly source file. FIG. 10 is an example of the source file, and FIG. 11 is an example of the assembly source file indicating contents in the object file, obtained by compiling the source file. The assembly source file is described in a mnemonic language corresponding to the type of each microcomputer, and is a program before it is converted to the object file. The assembly source file is a program for which conversion and addresses to which the operation jumps are undefined, and in which those addresses are represented with use of labels (L4, L5) and symbols (A5[sp], [lp]). The program 51 can be executed in this status using a target system, and be debugged for each object file 58a to 58c.

Then, the programmer 51 performs a link processing for integrating the three object files 58a to 58c into one file using a linker 54. The link processing is performed with use of the linker 54. The linker 54 links the object files 58a to 58c to make the execute form file 60 with reference to information from the LDF 53 and the device file 61.

In general, microcomputers use different types of useable instruction codes depending upon the types of themselves, and use different registers included in the microcomputers and different address spaces. ROMs (Read Only Memory) and RAMs(Random Access Memory) included in a microcomputer itself are different in their sizes depending upon the type thereof, and arrangement on the address is previously defined. Microcomputers of a certain type contain internally a RAM that operates at a high speed and contain externally a large capacity RAM that operates at a low speed. These RAMs are arranged in different address spaces. The programmer 51 develops a program to obtain maximum performance, taking performances and functions of these microcomputers into consideration. For example, the programmer 51 improves a processing speed of a program by instructing that variable data having high reference frequency are stored in the high speed RAM.

In contrast, microcomputer makers describe device information peculiar to each type of microcomputers in a manual 52a of the microcomputers, a manual 52b of the linker, and the device file 61, and provide such device information to the programmer 51. In the device file 61 there are recorded information defining the number and names of registers, the number of terminals of an input/output port, and so on. The programmer 51 prepares the LDF 53 in conformity with the construction of a microcomputer upon developing a program referring to such information. Herein, the LDF 53 means a file in which there is described an instruction to allocate various instruction codes and variable data (hereinafter referred to a section) included in the object files 58a to 58c to predetermined addresses in a memory space. For achieving the link processing as above the LED 53 is necessary.

When the object files 58a to 58c are converted to the execute form file 60, there are an instruction part(instruction code) and a variable data part (variable data) in the object files 58a to 58c. Conventionally, in the linker 54, its instruction code and variable data are disposed in a predetermined area of a memory (ROM and RAM) in conformity with ROM and RAM disposition information (hereinafter referred to memory disposition information ) of a microcomputer and the default LDF 53 or in conformity with the LDF 53 made anew. However, it is necessary to instruct such disposition in detail with use of an instruction document called LDF 53 in order to satisfactorily exhibit performance of amicrocomputer. Namely, the LDF 53 designates in detail addresses such that instruction codes and variable data are disposed at optimum positions in a memory.

Since to each microcomputer an address area in a memory is previously allocated, if there is no LDF 53, it becomes impossible to dispose instruction codes and variable data suitable for memory disposition for each microcomputer, and results in a difficulty that program development matched to a microcomputer is difficult.

Since the capacity of a memory included in a microcomputer is very smaller than that of a memory in a computer such as a personal computer, and the capacity of an included memory has a limit, it is very important to dispose instruction codes and variable data in conformity with memory disposition of a microcomputer as described above.

LDF 53 is prepared following a format that is previously determined. To the format information about memory disposition in a microcomputer is provided by the programmer 51. The linker 54 performs a link work such that instruction codes and variable data of the object files 58a to 58c can be disposed in a memory of a microcomputer. For example, it is performed as work that from what address to what address in a memory instruction codes are disposed, and that from what address to what address variable data is disposed. Further, the programmer 51 instructs variable data having high application frequency to be disposed in the high speed RAM, and variable data which is not required to be read at a very high speed to be disposed in an external low speed RAM.

FIG. 10 is an example of a source file list described in a C language. In the same figure, lines L1 to L3 define global variables a=1, b, c=0, and lines L4 to L8 define a function main ( ). Line L6 defines a local variable d, and line L7 represents execution of addition d=b+c+10. FIG. 11 is an example of a list of an assembly source file indicating contents in the object file, described in a mnemonic language which is obtained by compiling the source file illustrated in FIG. 10. In the same figure, lines L01 to L05 are a description area concerning a section ". sdata", which section is read and written at a high speed with an instruction where the size of an instruction code is short, and to which section a variable having a predetermined length (e.g., variable c) belongs. Lines L06 to L07 are a description area concerning a section ". sbss", which section is read and written at a high speed with an instruction where the size of an instruction code is short, but to which section a variable (e.g., a variable b) belongs, the value of which variable is undefined upon compiling and to which variable a predetermined value can be set.

Lines L08 to L12 are a description area concerning a section ". const", which section can be only read and to which section a variable (e.g., a variable a) belongs. The sizes of sections ". sdata", ". sbss", ". const" are described after variable names on lines L03, L07, L10, which sizes are 4 bytes in the present example, respectively. The size corresponds to the size of each section when the execute form file is made. Lines L13 to L31 are a description area concerning a section ". text", which section can be only read, and to which section a function main ( ) having an execute form code belongs. Since in the stage of the assembly resource file, an address to jump is undefined, and the accurate size of the section ". text" is unknown, which size is not indicated in the list. The programmer 51 can be informed of the size by executing compiling or linking. The programmer 51 can thus obtain section information of the object files 58a to 58c by converting the source files 55a to 55c to the object files 58a to 58c with use of the compiler 57.

The section is a basic unit constituting the object file 58 and corresponds to the assembly source file in FIG. 11. The object file 58a is divided into sections such as ". sdata", ". sbss/", ". const", ". text". The object files 58b, 58c have also sections illustrated in FIG. 17. Arrangements of the object file 58 and the execute form file 60 depend upon programmers, and FIG. 17 is an example of such arrangements. The linker 54 makes segments 28a to 28f by linking sections of the same type and the same attribute in the object files 58a to 58c.

For the section attribute there are A attribute being a section occupying the memory, W attribute being a writable section, X attribute being an executable section, and G attribute being a segment which can be referred to by a global pointer, and each section in the object file 58 has one of these attributes or combined attribute where these attributes are combined.

For the section types there are PROGBITS which has an actual value in the object file 58, and NOBITS which does not have any actual value in the same.

For the kinds of the sections there are NOBITS type A,W attribute section ". bss", PROGBITS type A attribute section ". const", PROGBITS type A, W attribute section ". data", PROGBITS type A, X attribute section ". text", and so on. For sections which have short code size instructions and to which are accessible at a high speed there are ". sbss", ". sconst", ". sdata" and so on.

The segment means a lump of sections having the same attribute and type, which is a basic unit when a program is loaded in a memory. Segment names, attributes, and addresses to be loaded, and the like can be designated by the LDF 53. The linker 54 makes as described above the segments 28a to 28c by combining several sections constituting the object files 58a to 58c.

FIG. 12 is a view exemplarily illustrating description contents in the LDF 53. Lines LD01 to LD03 are description concerning the segment SCONST 28a, which instructs the segment SCONST 28a to link the section ". sconst". Since an address to be linked is not designated, the LDF 53 disposes the section ". sconst" to a start address (0x000000).

Lines LD04 to LD06 are description concerning the segment TEXT 28b, which instructs the section ". sconst" belonging to the segment TEXT 28b to be linked, succeeding to the segment SCONST 28a. Lines LD07 to LD12 are description concerning the segment DATA 28c, which instructs sections "data", ". sdata", ". sbss", and ". bss" belonging to the segment DATA 28c from an address (0x100000) to be linked in this order.

Lines LD13 to LD15 are description concerning the segment CONST 28d, which instructs a section ". const" belonging to the segment CONST 28d to be linked, succeeding to the segment DATA 28c. Lines LD16 to LD19 are description concerning to a segment SEDATA 28e, which instructs sections ". sedata" and ". sebss" belonging to the segment SEDATA 28e to be linked in this order from an address (0xff6000). Lines LD20 TO LD25 are description concerning segment SIDATA 28f, which instructs sections ". tidata.byte", ". tidata.word", ". tidata", ". sidata" belonging to the segment SIDATA 28f to be linked in this order from an address (0xffe000). Lines LD26 to LD28 are description concerning a text pointer symbol tp_TEXT, a global pointer symbol gp_DATA, and an element pointer symbol ep_DATA.

The text pointer symbol tp_TEXT designates a head address of the segment TEXT, which is used as a base address upon accessing an instruction code in the segment TEXT, in which the text pointer symbol tp_TEXT is taken as a reference to access any instruction code and variable data using an offset address from the reference. This is because the instruction code and variable data are compiled not to depend upon their position to be disposed.

Hereby, even if a position of an execute file to be disposed is altered, a program can be executed only by altering the address of the text pointer symbol tp_TEXT. If the text pointer symbol tp_TEXT is not provided, the linker 54 must again calculate an address to be branched in the segment TEXT every time the size of the segment 10 SCONST linked before the segment TEXT is different. The global pointer symbol gp_DATA is the same as the text pointer symbol tp_TEXT, which pointer is used as a reference upon accessing to variable data.

More specifically, an address at which variable data is existent can be indicated with an offset address from the global pointer symbol gp_DATA. Since the sections ". sbss" and ". sdata" can be represented by a 1 byte offset address, an instruction code is shortened for high speed access. Against this, since the sections ". bss" and ". data" can be represented by a 2 byte offset address, the instruction code is more lengthened than ". sbss" and ".sdata" correspondingly increasing access time. There is a range which is accessible by an instruction which can process at a high speed variable data in the high speed internal RAM, and the element pointer symbol ep_DATA indicates a reference to access the range.

FIG. 17 is a view illustrating a concept of the link processing. In the same figure, the left side indicates statuses of the object files 58a to 58c before subject to the link processing, and each object file 58a to 58c has a plurality of sections ". text", ". data", and the like. The right side indicates the statuses of segments 28a to 28f after subject to the link processing, and the sections are linked on the basis of an instruction of the LDF 53. Arrows in the same figure indicate a positional relationship among the sections before and after the link processing.

It is noted that the arrangement of the sections of the object files 58a to 58c is different depending upon contents of the source files 55a to 55c to be developed. The segments 28a to 28f are herein constructed with the segments SCONST 28a, TEXT 28b, DATA 28c, CONST 28d, SEDATA 28e, and SIDATA 28f, although the construction is different depending upon a memory space of a microcomputer and disposition in the memory space.

The segments SCONST 28a and TEXT 28b are disposed in an internal ROM 25 (FIG. 2) described later, and the segments DATA 28c, CONST 28d, SEDATA 28e are disposed in the external RAM 26 (FIG. 2), and further the segment SIDATA 28f is disposed in the internal RAM 27 (FIG. 2). In FIG. 17, 0x means an address indicated by hexadecimal notation, the segment SCONST 28a is disposed in order from an address (0x000000), the segment DATA 28c is disposed in order from an address (0x100000), and the segment SIDATA 28f is disposed in order from an address (0xffe000).

Since memory capacity and disposition are different depending upon the type of a microcomputer, the programmer 51 disadvantageously fails to memorize all address information about that type, and can not grasp an actual image of memory disposition. More specifically, the programmer 51 can not grasp at which address in the memory space a ROM is disposed or at which address a RAM is disposed. Conventionally, the programmer 51, when making the LDF 53, makes it using a text editor, etc., with reference to a specification and manuals 52a, 52b prepared for each microcomputer.

The programmer 51 is needed to check whether or not contents of the description of the LDF 53 are correct, looking at the LDF 53 thus made, and further verify contents of the description in the LDF 53. The verification is to check whether or not the object files 58a to 58c can be linked, whether or not instruction codes and variable data can be disposed in a designated memory area, and whether or not they are actually disposed. When as the result of the verification they can not be disposed in a predetermined manner, the linker 54 outputs error, and hence the programmer 51 must correct the contents. The programmer 51 repeats works of such verification and correction until the error is removed to make the LDF 53.

FIG. 16 is a flow chart schematically illustrating a conventional method of making the LDF. The method will be described with reference to FIGS. 15 and 16. In the first place, in step S1, the programmer 51 checks memory disposition information of a microcomputer with reference to a manual 52a of the microcomputer. The memory information includes necessary information such as addresses and sizes of a ROM/RAM contained in the microcomputer. Instep S2, the programmer 51 makes the LDF 53 based upon the memory disposition information using the text making tool 56, display 59, and input means 62. The text making tool 56 has functions of inputting and editing characters, and makes the LDF data illustrated in FIG. 12 and stores it in the LDF 53. In step S3, the programmer 51 checks whether or not there is description error in contents of the made LDF 53 referring to the manual 52a of the microcomputer.

In step S4, the programmer 51, if there is any error in the description of the LDF data, corrects it using the text making tool 56, and rewrites the LDF 53.

In step S5, the programmer 51 subjects the object files 58a to 58c to the link processing with the aid of the linker 54 based upon the made LDF 53.

The linker 54 executes verification processing together with the link processing. For example, when predetermined segments are not settled in the range of the memory disposition information described in the device file 61, the linker 54 outputs error information. The programmer 51 can verify the LDF data and check presence of any error using the linker 54.

In step S6, the programmer 51 checks presence of any link error. When there is any error due to the LDF data, the programmer 51 advances to presence, and the programmer 51 again repeats steps S4 to S5 until the cycle error is removed to complete the LDF 53. When there is no error or when there is error not related to the LDF, there is no problem in the contents of the LDF 53. The programmer 51 thus completes the LDF making processing.

FIG. 17 exemplarily illustrates a result of the link processing where the object files 58*a* to 58*c* are subjected to the link processing with the aid of the linker 54 based upon the LDF 53. As illustrated in the same figure, the sections in each segment 28*a* to 28*f* are combined, and sections ". data", . . . belonging to the segment DATA 28*c* are disposed within a predetermined range from an address (0x100000), and ". tidata. byte", . . . belonging to the segment SIDATA 28*f* are disposed within a predetermined range.

Since for the aforesaid text pointer symbol tp_TEXT and global pointer symbol gp_DATA their actual addresses are determined when they are converted to the execute form file 60, in the LDF 53 illustrated in FIG. 15 only kinds of symbols used and attributes f the same are described on the lines LD26 to LD28, and actual addresses are not designated.

It is ordinarily unknown how much the SCONST segment 28*a* occupies a memory area. For this, the programmer 51 disposes it behind the SCONST segment 28*a* and defines it without designating start address of the TEXT segment 28*b*, whereby the LDF 53 is easily made. Since the linker 54 can make a program in the TEXT segment 28*b* with a relative address which takes as a reference an address designated by the text pointer symbol tp_TEXT, it is unnecessary to rewrite an address to be branched in the TEXT segment 28*b* even if the size of the SCONST segment 28*a* is varied. A programmer can effectively develop a program by using such pointers, as described above.

Such a conventional method of making the LDF however suffers from a difficulty that when the LDF is written manually, it takes much labor until it is finished because mistaken description is inevitable. More specifically, a programmer makes the LDF manually in the state where it is difficult to know an image of actual disposition of instruction codes although he can check memory disposition information, etc., of a microcomputer from its manual.

The programmer is accordingly obliged to promote works in a trial and error so that he might often take mistakes: he forgets necessary information or erroneously describes any information. Thus, he takes much time for works such as check and correction of contents of the works.

In order to reduce mistaken description an expert is required for making the LDF, and hence LDF making work is limited. Further, the made LDF must be verified with the linker, so that further labor is needed to complete the work.

Since memory capacity and disposition are different for each type of microcomputers, even an expert can not memorize such information. The programmer 51 must search any page of a thick manual on which necessary information is described, and detect memory disposition information. This work requires much time, and further lowers development efficiency of a program.

SUMMARY OF THE INVENTION

The present invention has been made to solve the aforesaid problems of the prior art, and has an object to provide a method of making a link directive file capable of simply grasping memory disposition and size information upon developing a program for an information processing apparatus such as a microcomputer and upon using link processing and making a link directive file, and further provide a tool for making the aforesaid link directive file.

To achieve the aforesaid object, a method of making a link directive file, the file being used for link processing where a plurality of objects are linked to an execute form file and disposing instruction codes and variable data in a memory space, according to a first aspect of the present invention, is featured by comprising the step of: visually displaying the aforesaid link directive file as a memory image.

In the foregoing, a mode is desirable wherein a method of making a link directive file is featured by that a plurality of kinds of memories are disposed in the aforesaid memory space, and for the memories kinds of the memories and start addresses of the memories are displayed in the order of addresses.

Further, a mode is desirable wherein a method of making a link directive file is featured by that the aforesaid execute form file includes a plurality of different attribute segments, and names of said segments and start addresses of the aforesaid segments are displayed in the order of the addresses in the aforesaid memory space.

Furthermore, a mode is desirable wherein a method of making a link directive file is featured by that each the aforesaid segment includes a plurality of different attribute sections, and names of the aforesaid sections and start addresses of the aforesaid sections are displayed in the order of the addresses in the aforesaid memory space.

According to a second aspect of the present invention, a method of automatically making a link directive file used for link processing where a plurality of object files are linked into an execute form file to dispose instruction codes and variable data in a memory space and instruct the aforesaid instruction codes and the aforesaid variable data, is featured by that the method comprises the step of comparing the size of the memory disposed in the aforesaid memory space and the size of the aforesaid instruction codes or the aforesaid variable data to be added or altered, and judging whether or not the aforesaid instruction codes or the aforesaid variable data can be disposed.

According to a third aspect of the present invention, a method of making a link directive file which is used for link processing where a plurality of object files are linked into an execute form file to dispose instruction codes and variable data in a memory space, is featured by that the method comprises the step of: reading memory disposition information from a device file containing at least address size information concerning each individual device; reading the aforesaid link directive file for instructing a disposition position of each constituent component of the aforesaid object file; visually displaying the aforesaid memory disposition information and the aforesaid link directive data on a display as a memory image; and altering contents of a part needed to be altered on the aforesaid memory image referring to the aforesaid memory image to alter the aforesaid memory image.

In the foregoing, a mode is desirable wherein a method of making a link directive file according to the third aspect is featured by that a memory image is displayed on the basis of default said directive information inherent to a device.

Further, a mode is desirable wherein a method of making a link directive file is featured by that memory information from the aforesaid device file and directive data from the aforesaid link directive file, and link directive data concerning an execute form from an execute form file are read to display on the aforesaid display a memory image after the link processing.

Furthermore, a mode is desirable wherein information of a part on the aforesaid memory image is selected to display information of a lower hierarchy of said information.

According to a fourth aspect of the present invention, a tool for making a link directive file, the file being used for link processing where a plurality of object files are linked into an execute form file to dispose instruction codes and variable data in a memory space, is featured by comprising : memory disposition information storage means for storing therein memory disposition information containing at least address size information concerning each individual device; link directive file data holding means for holding link directive file data for indicating a position where a constituent element of the aforesaid object file is disposed in the execute form file; memory image display means for displaying the memory image on the basis of the aforesaid memory information held in the aforesaid memory disposition information storage means and the aforesaid link directive data held in the aforesaid link directive file data holding means; and data edit means for altering contents of information of a part needed to be altered on the aforesaid memory image with reference to the aforesaid memory image to update the aforesaid memory image.

In the foregoing, a mode is desirable wherein a tool for making a link directive file is featured by that there is provided link directive file read means for reading the link directive file.

Further, a mode is desirable wherein a tool for making a link directive file according to the tenth or eleventh aspect is featured by that there is provided execute form analysis means for reading the execute form file after subjected to the link processing, analyzing constituent elements of the execute form file, and storing the link directive information in the aforesaid link directive file data holding means.

Furthermore, a mode is desirable wherein a tool for making a link directive file is featured by that the aforesaid data edit means has a function in which partial information on said memory image is selected to display lower rank hierarchy information of the aforesaid information.

Still furthermore, a mode is desirable wherein a tool for making a link directive file is featured by that there is provided default link directive file data holding means.

In accordance with a method of making an LDF of the present invention and a tool for making a tool of the present invention, as described above, amemory image is visually displayed on a display so that a memory image of a microcomputer is simply successfully grasped.

Moreover, the LDF is automatically made by altering contents of information of a part on a memory image needed to be altered, and updating the memory image while looking at the memory image.

The LDF is automatically made without relying on those skilled in the art.

BRIEF DESCRIPTION OF THE DRAWINGS

The above and other objects, advantages and features of the present invention will be more apparent from the following description taken in conjunction with the accompanying drawings in which:

FIG. 11 is a view exemplarily illustrating an assembly source file indicating contents of an object file for use in the method of making the LDF of FIG. 9;

FIG. 12 is a view exemplarily illustrating the LDF made by the method of making the LDF of FIG. 9;

DESCRIPTION OF THE PREFERRED EMBODIMENTS

Referring to accompanying drawings some preferred embodiments of the present invention will be described in more detail.

Figure 1:
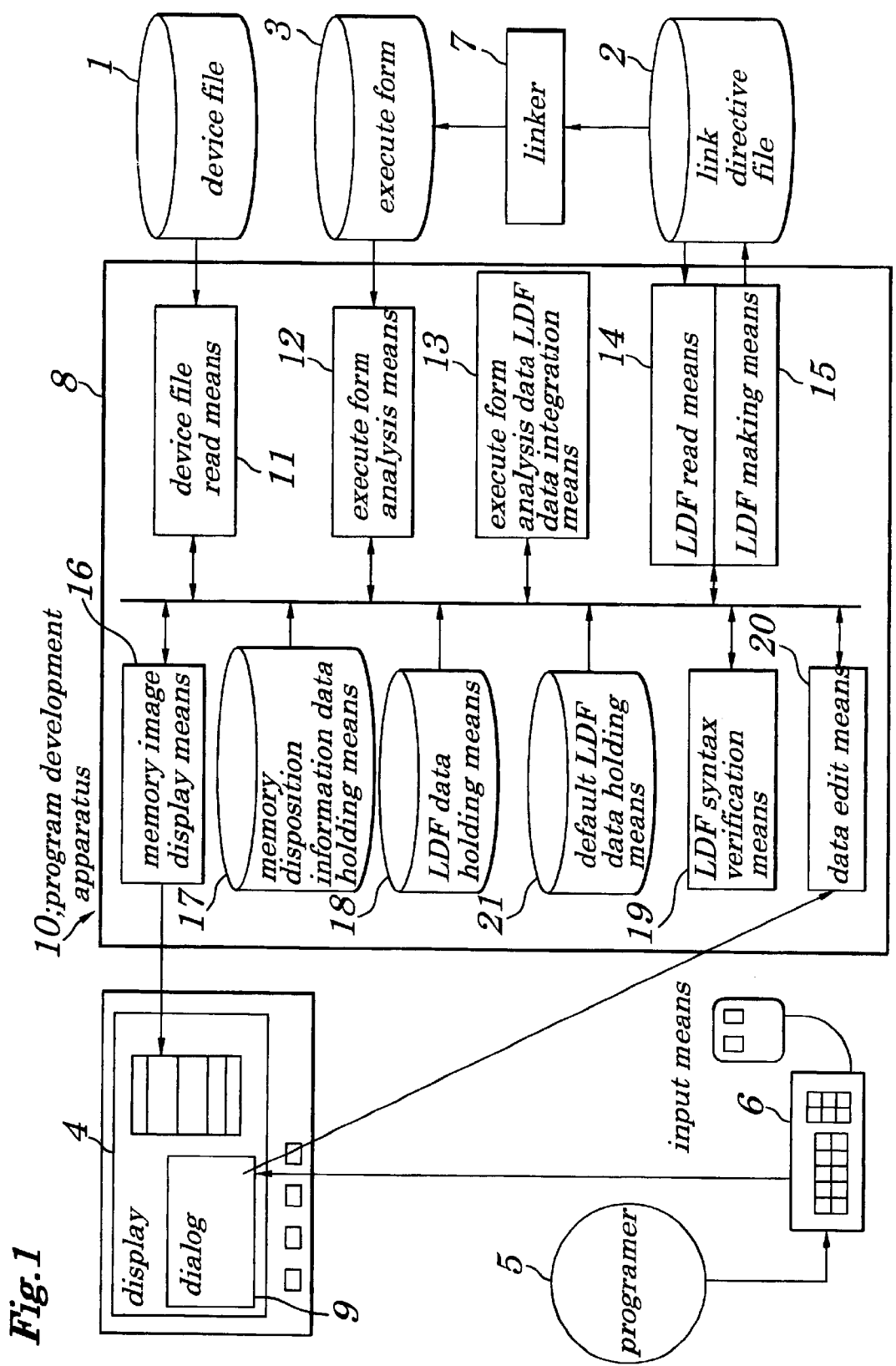
FIG. 1 is a block diagram schematically illustrating a program development apparatus for use in a method of making LDF being a preferred embodiments of the present invention.
Figure 2:
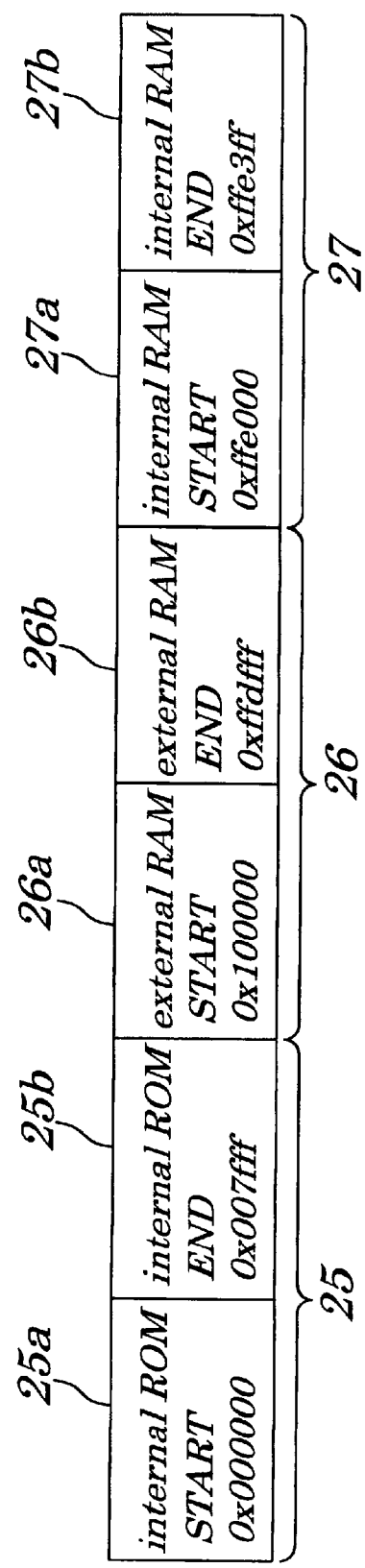
FIG. 2 is a view illustrating the arrangement of memory disposition information stored in a device file constituting the program development apparatus.
Figure 3:
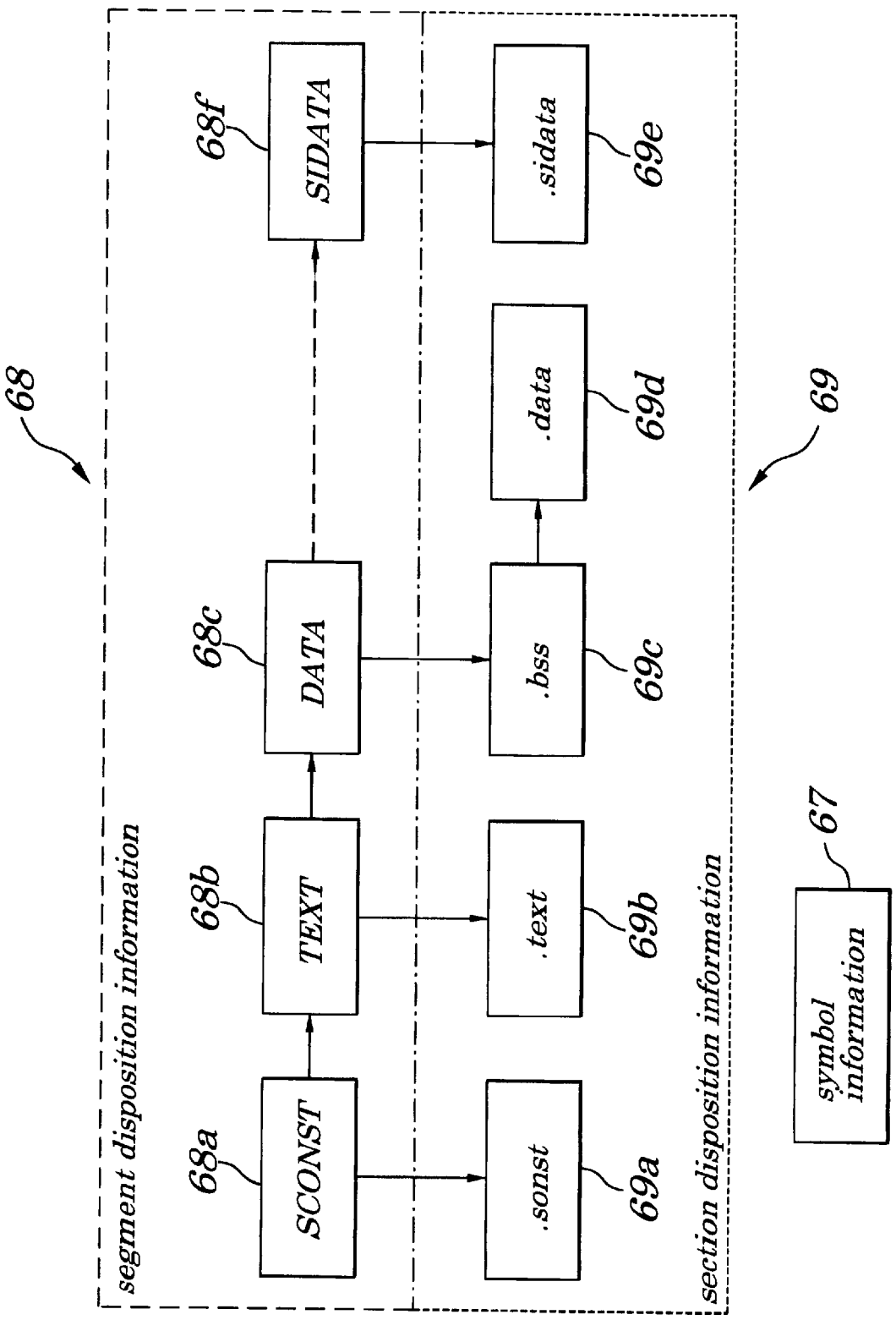
FIG. 3 is a view exemplarily illustrating segment disposition information stored in LDF data holding means constituting the program development device.
Figure 4:
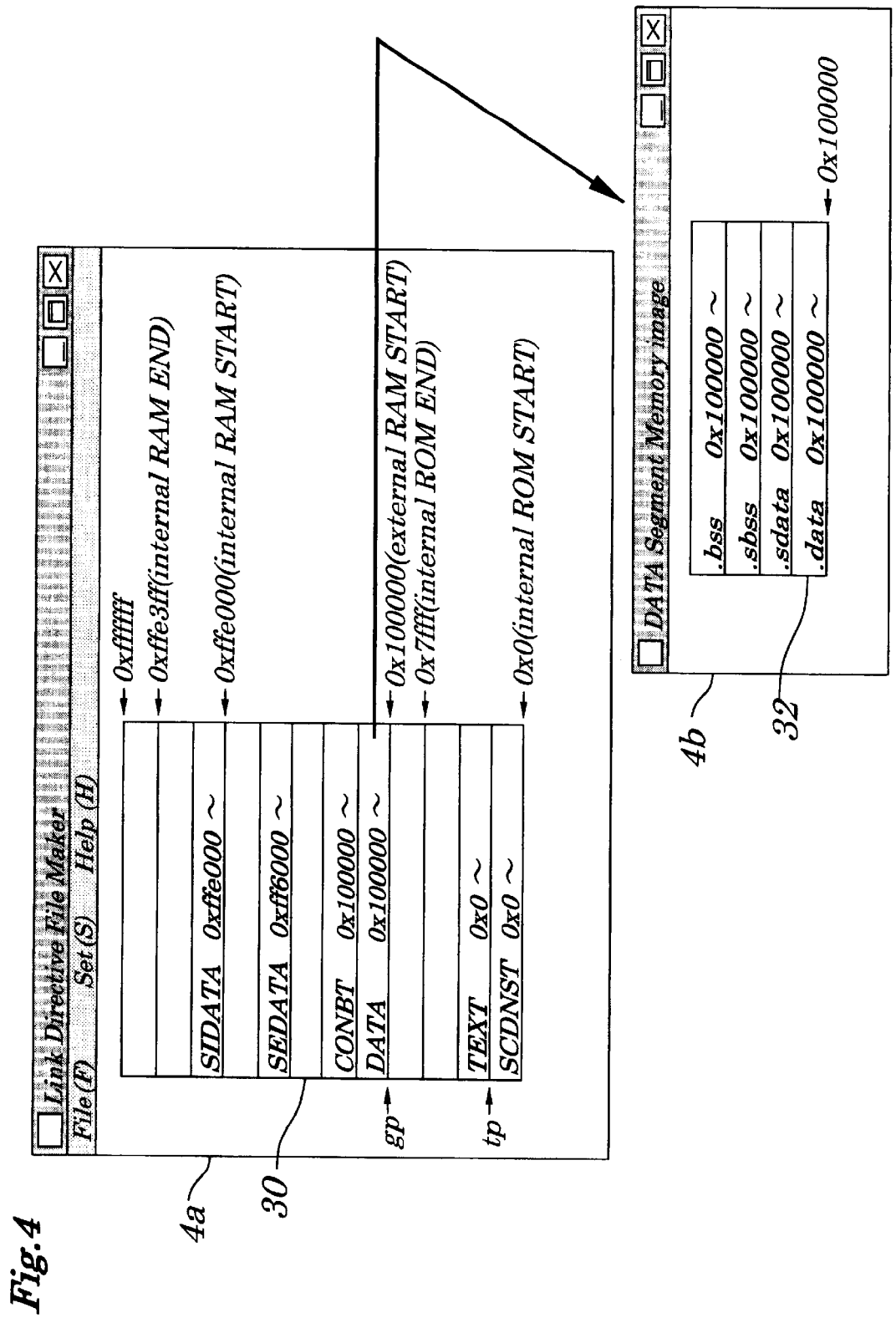
FIG. 4 is a view of a memory image in which default LDF data is visually illustrated on a display in the embodiment of FIG. 1.
Figure 5:
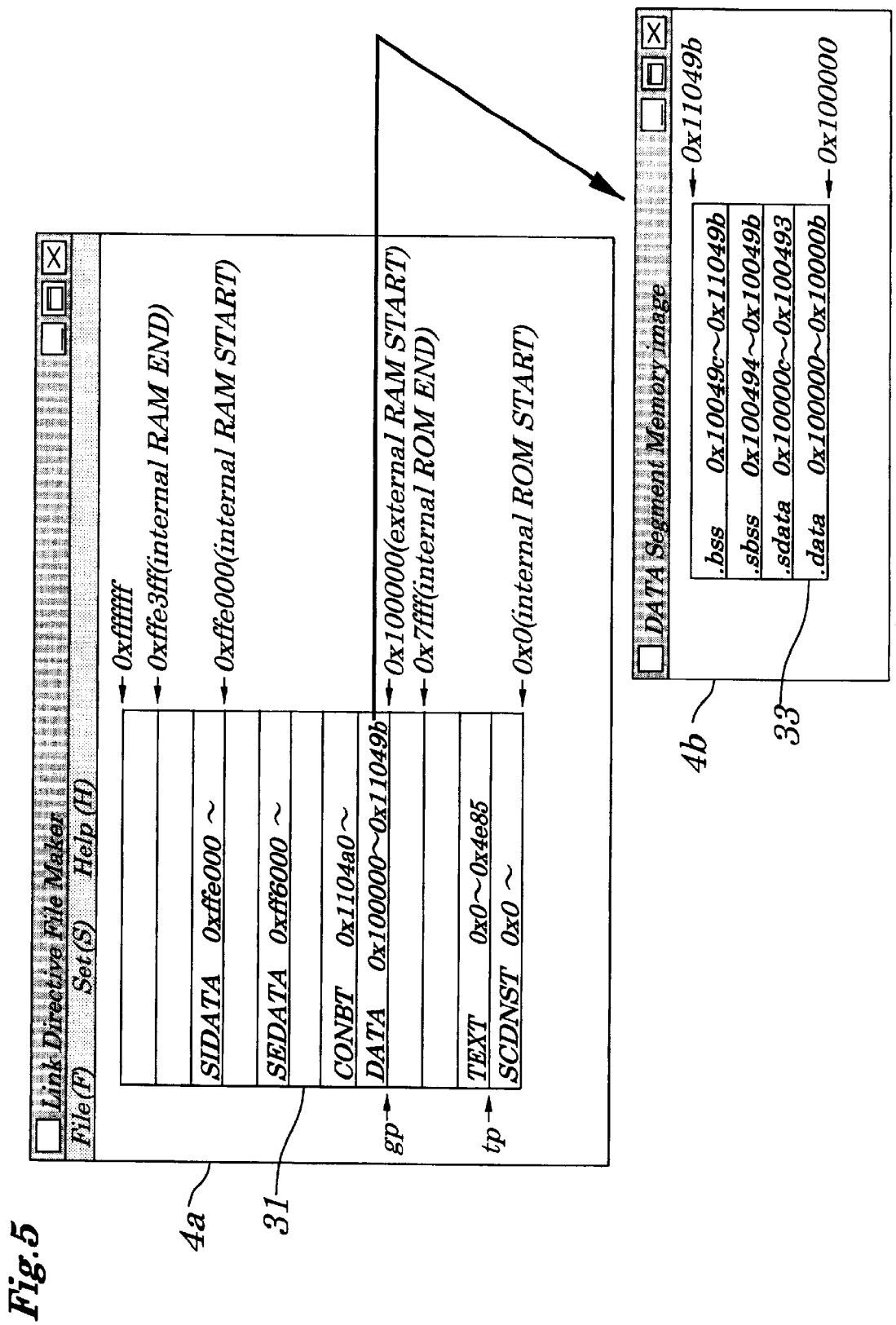
FIG. 5 is a view of a memory image in which the LDF data after subjected to link processing is visually displayed on a display in the embodiment of FIG. 1.
Figure 6:
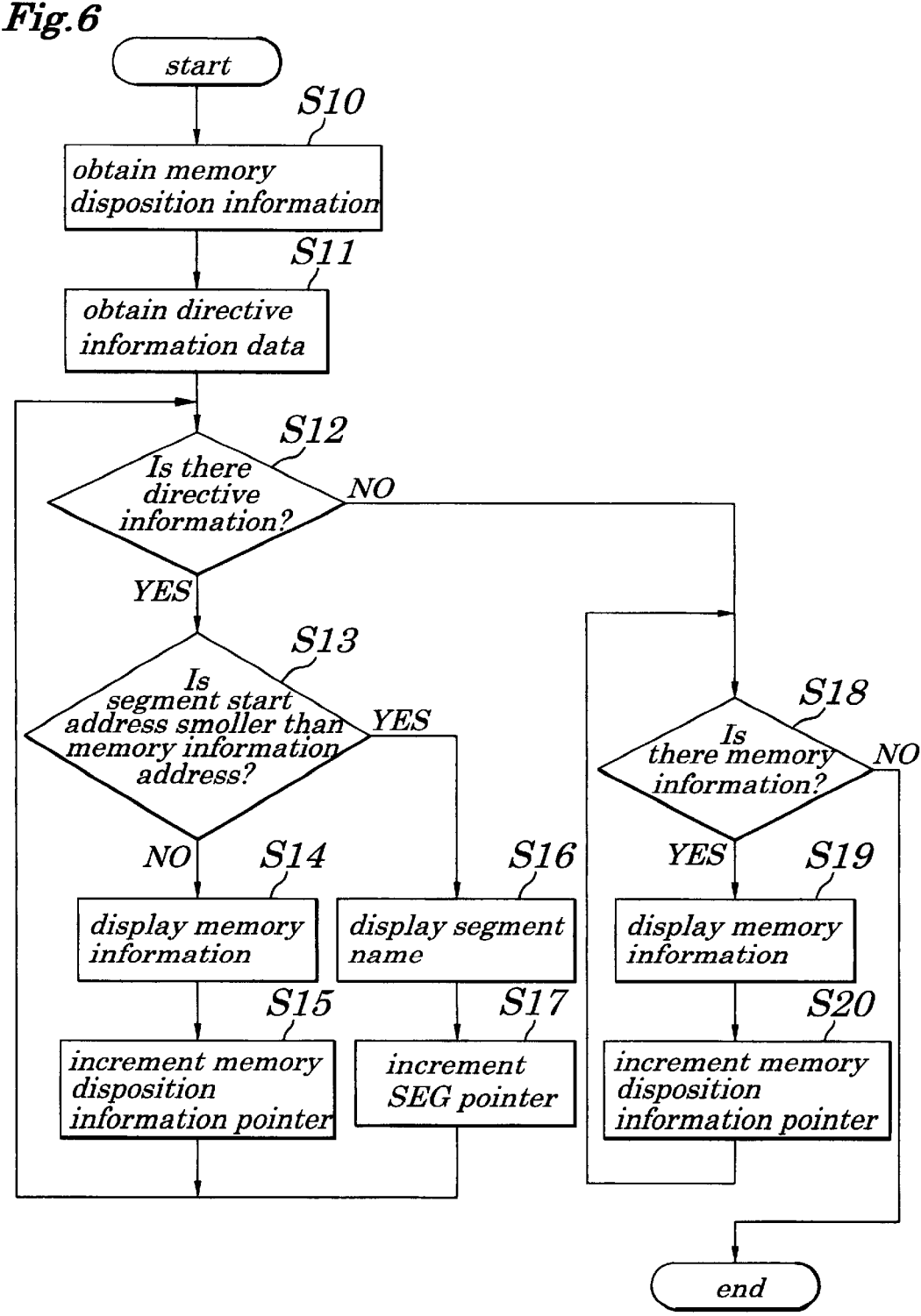
FIG. 6 is a flow chart schematically illustrating a method of displaying a memory image on a display in the embodiment of FIG. 1.
Figure 7:
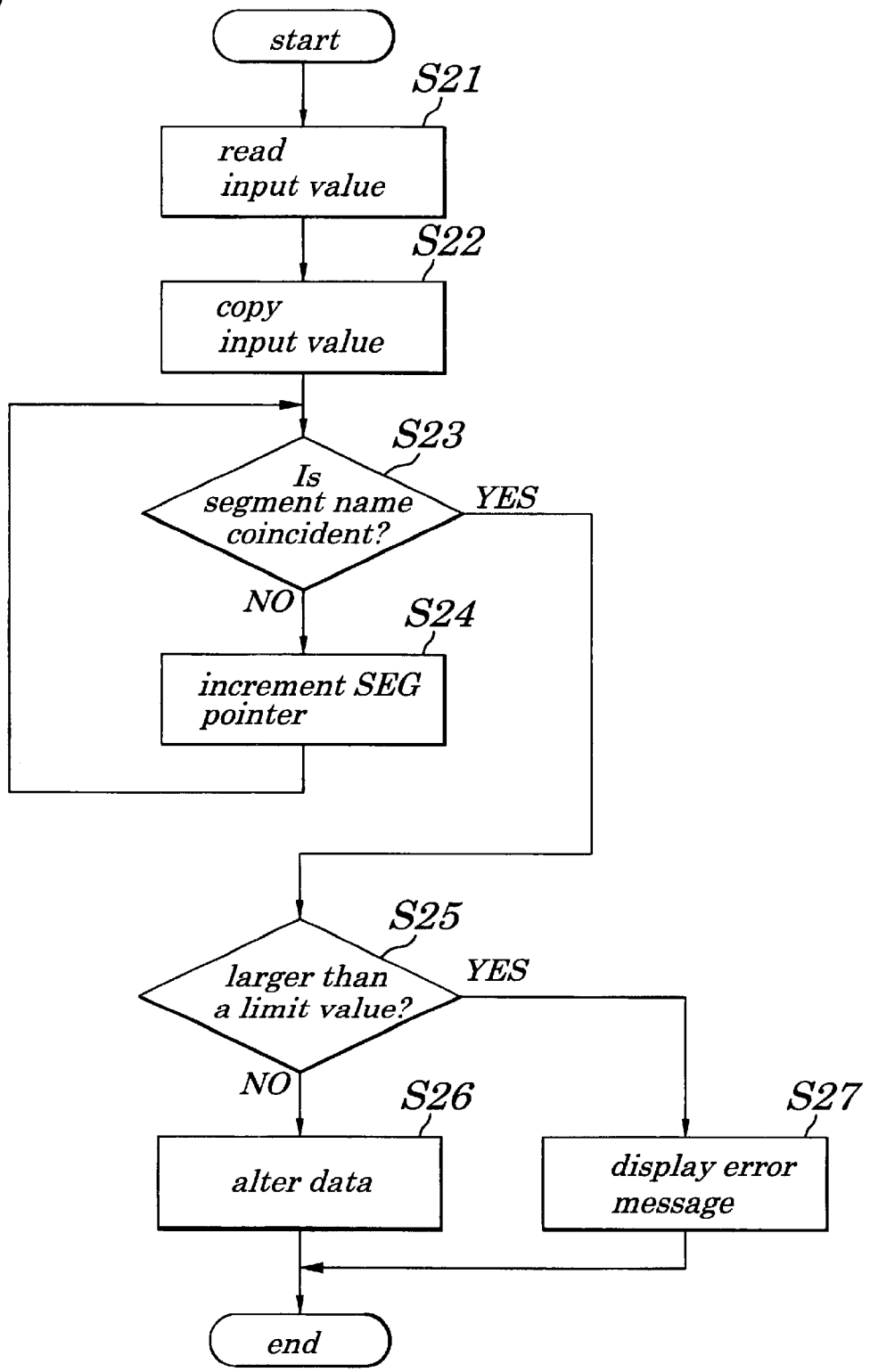
FIG. 7 is a flow chart schematically illustrating a sequence in which data is altered and verified in the embodiment of FIG. 1.
Figure 8:
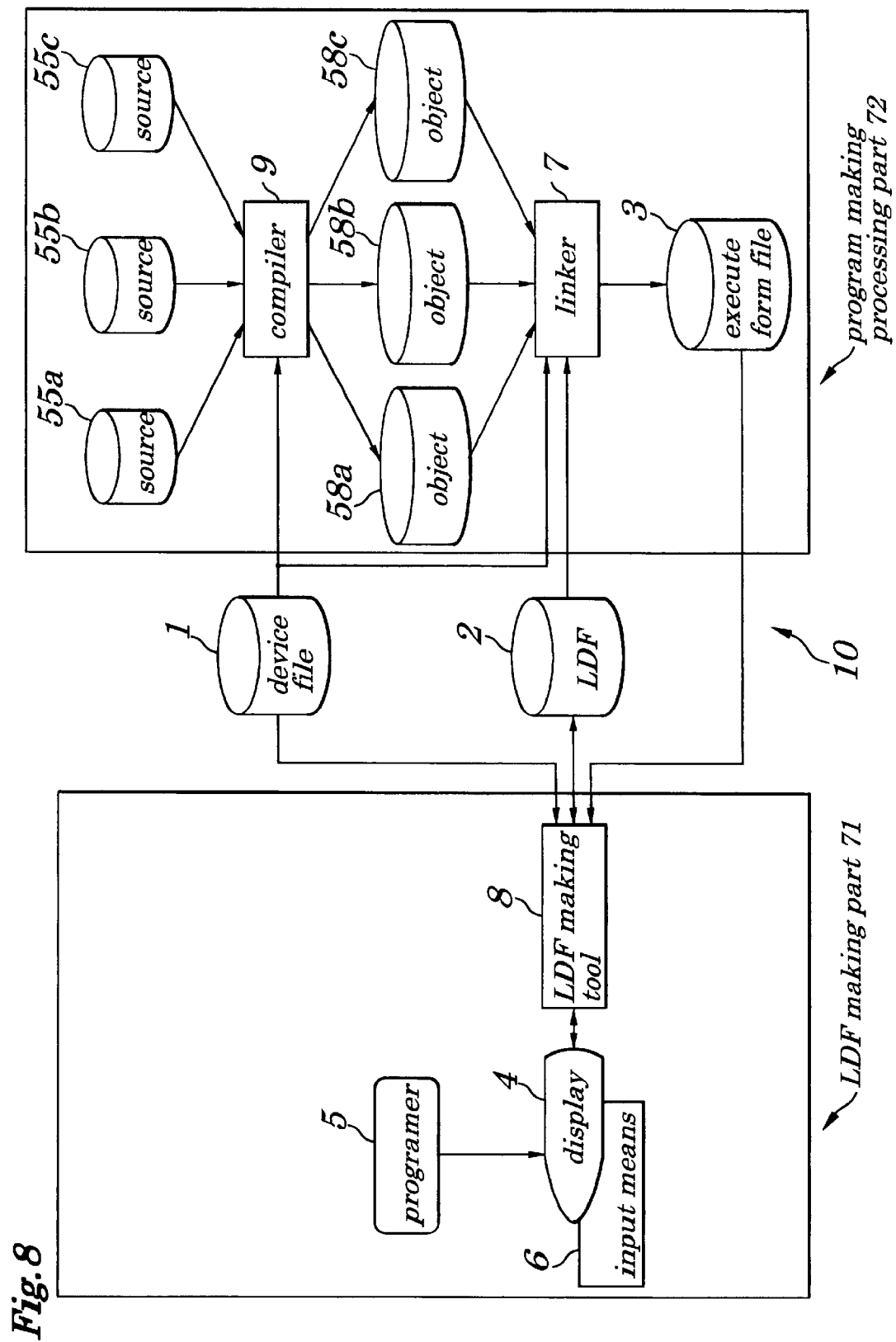
FIG. 8 is a view schematically illustrating the construction of the program making device of FIG. 1.
Figures 9, 10:
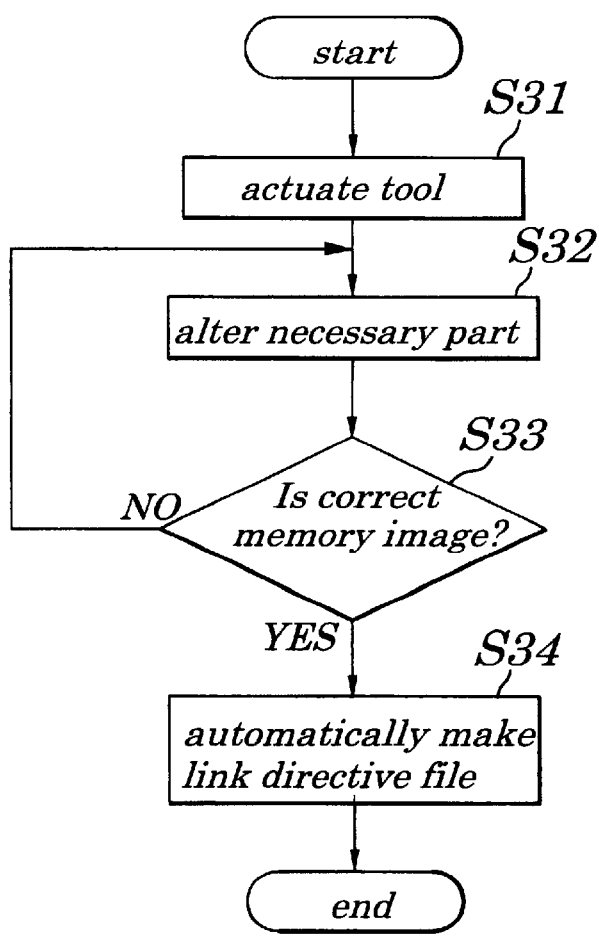
FIG. 9 is a flow chart schematically illustrating a method of making the LDF in the embodiment of FIG. 1.
FIG. 10 is a view illustrating a source file list for use in the method of making the LDF of FIG. 9.
Figure 13:
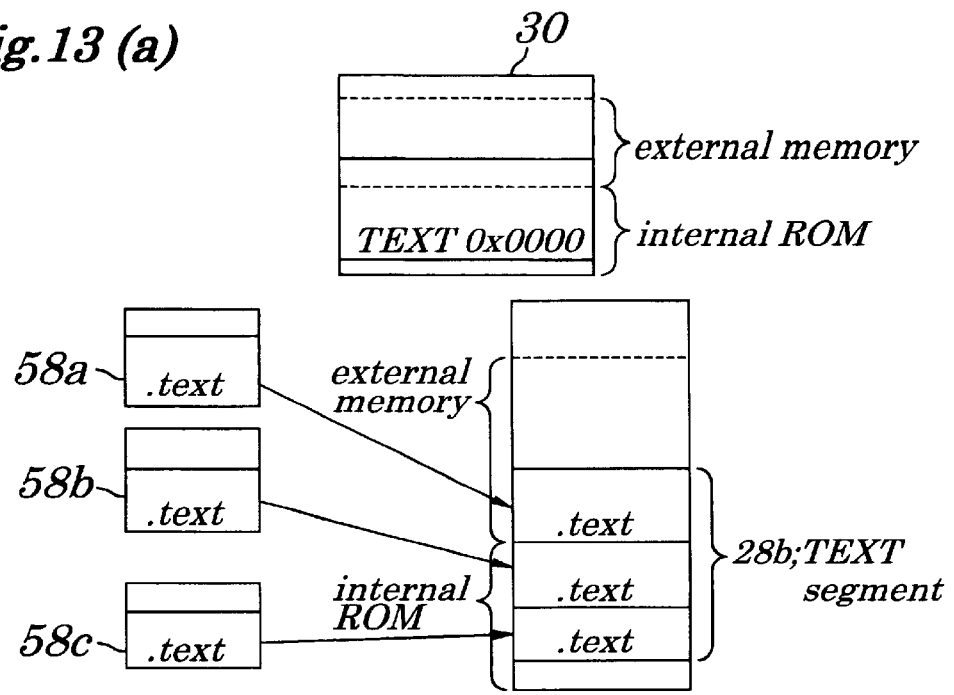
FIGS. 13($a$) and 13($b$) are views illustrating a relationship between the LDF data and link processing operation in the method of making the LDF of FIG. 9.
Figure 13:
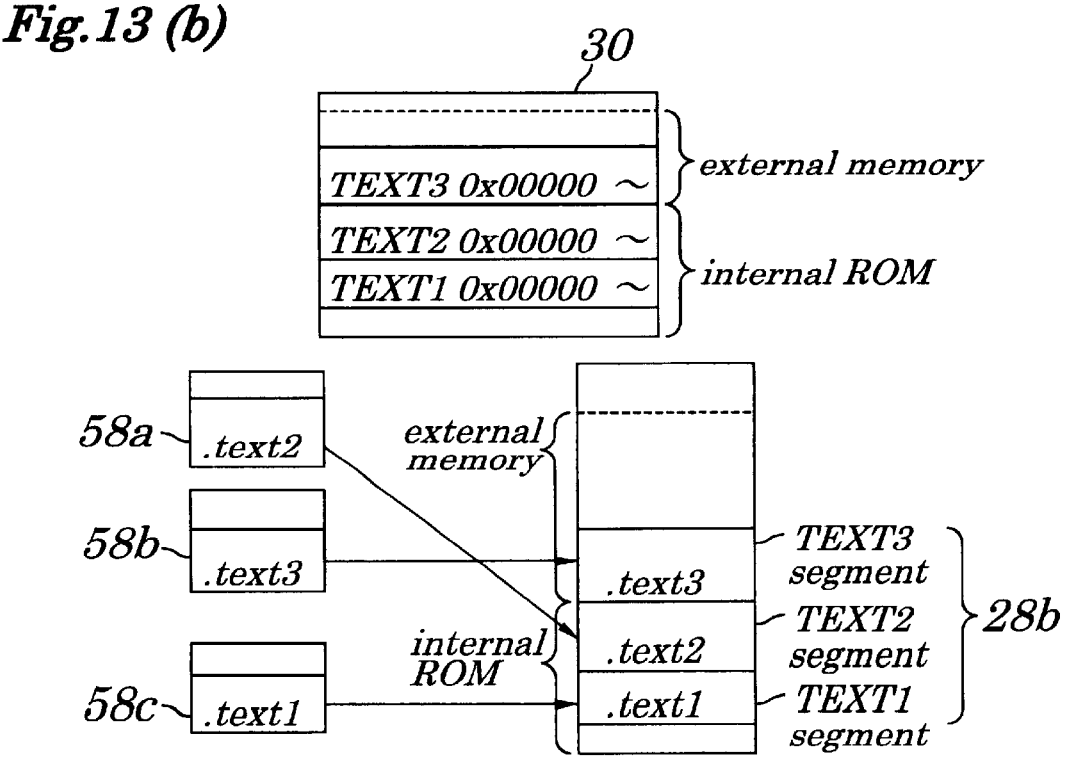
Figure 14:
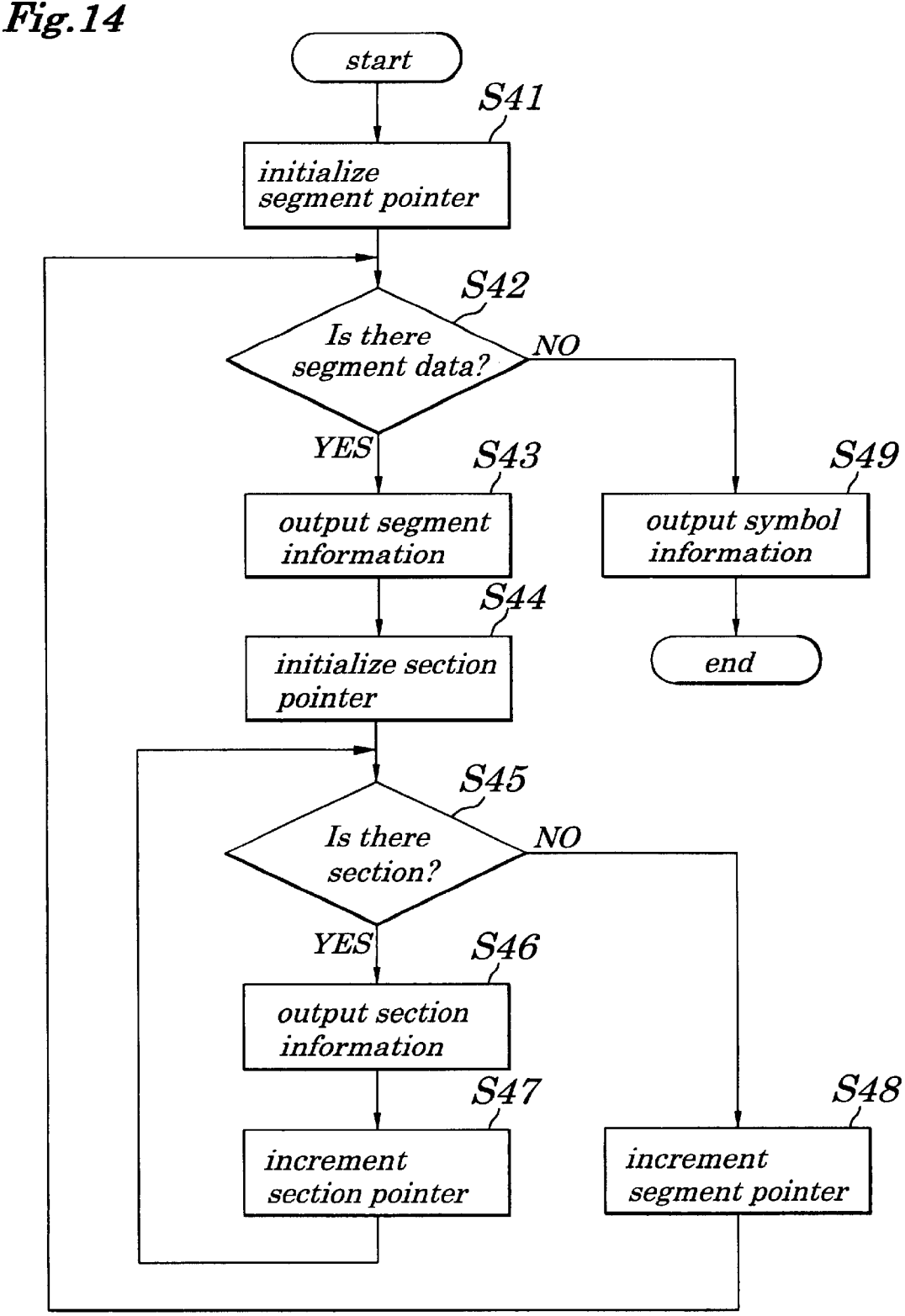
FIG. 14 is a flow chart illustrating a method of automatically making the LDF data in the method of making the LDF of FIG. 9.
Figure 15:
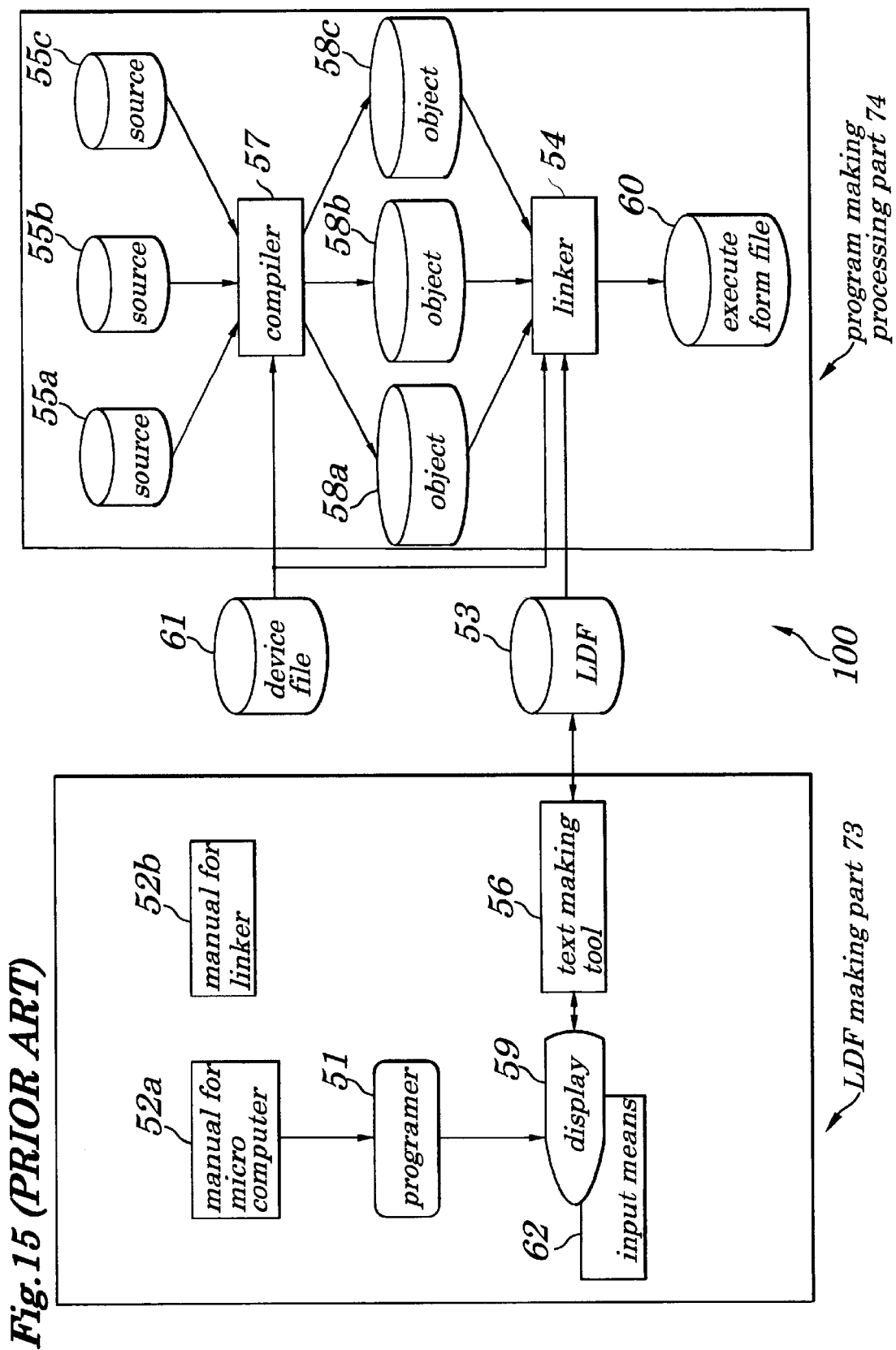
FIG. 15 is a view schematically illustrating the construction of a program development apparatus for use in a conventional method of making the LDF.
Figure 16:
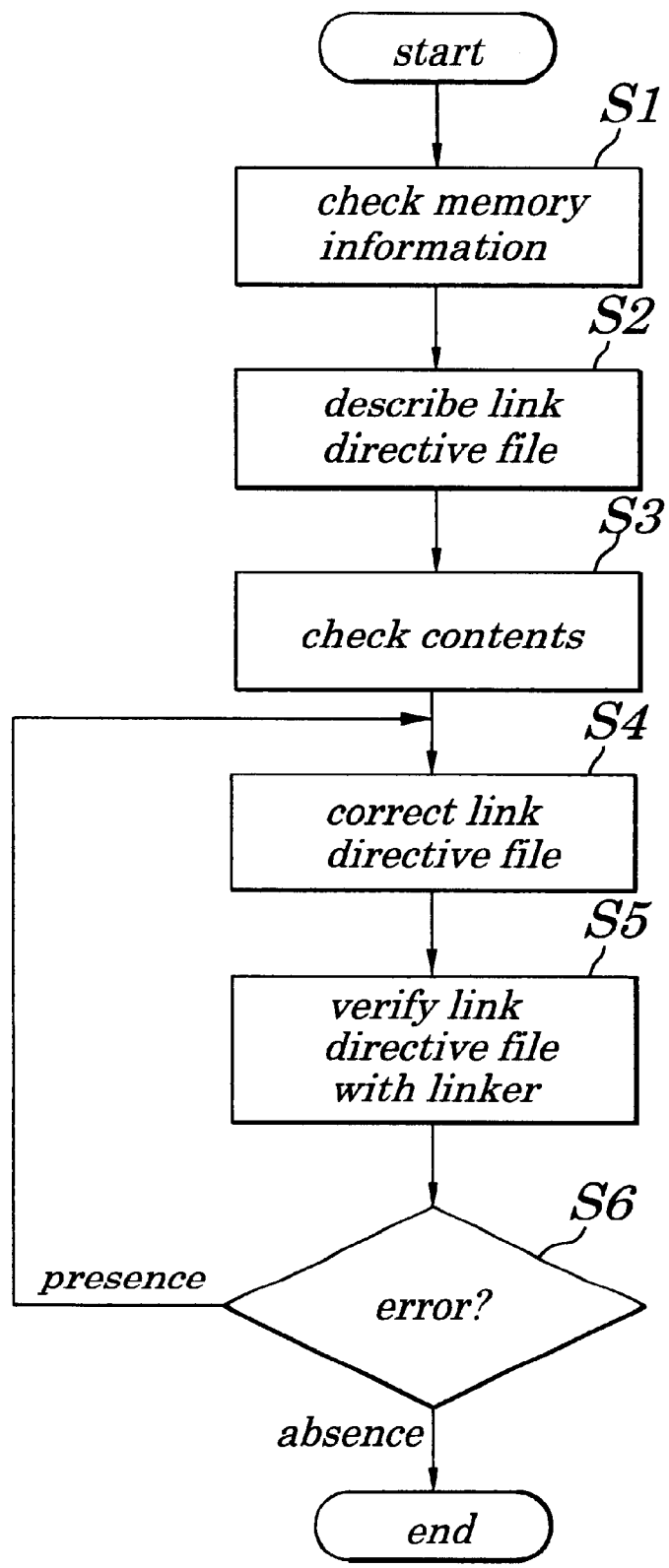
FIG. 16 is a flow chart illustrating the conventional method of making the LDF.
Figure 17:
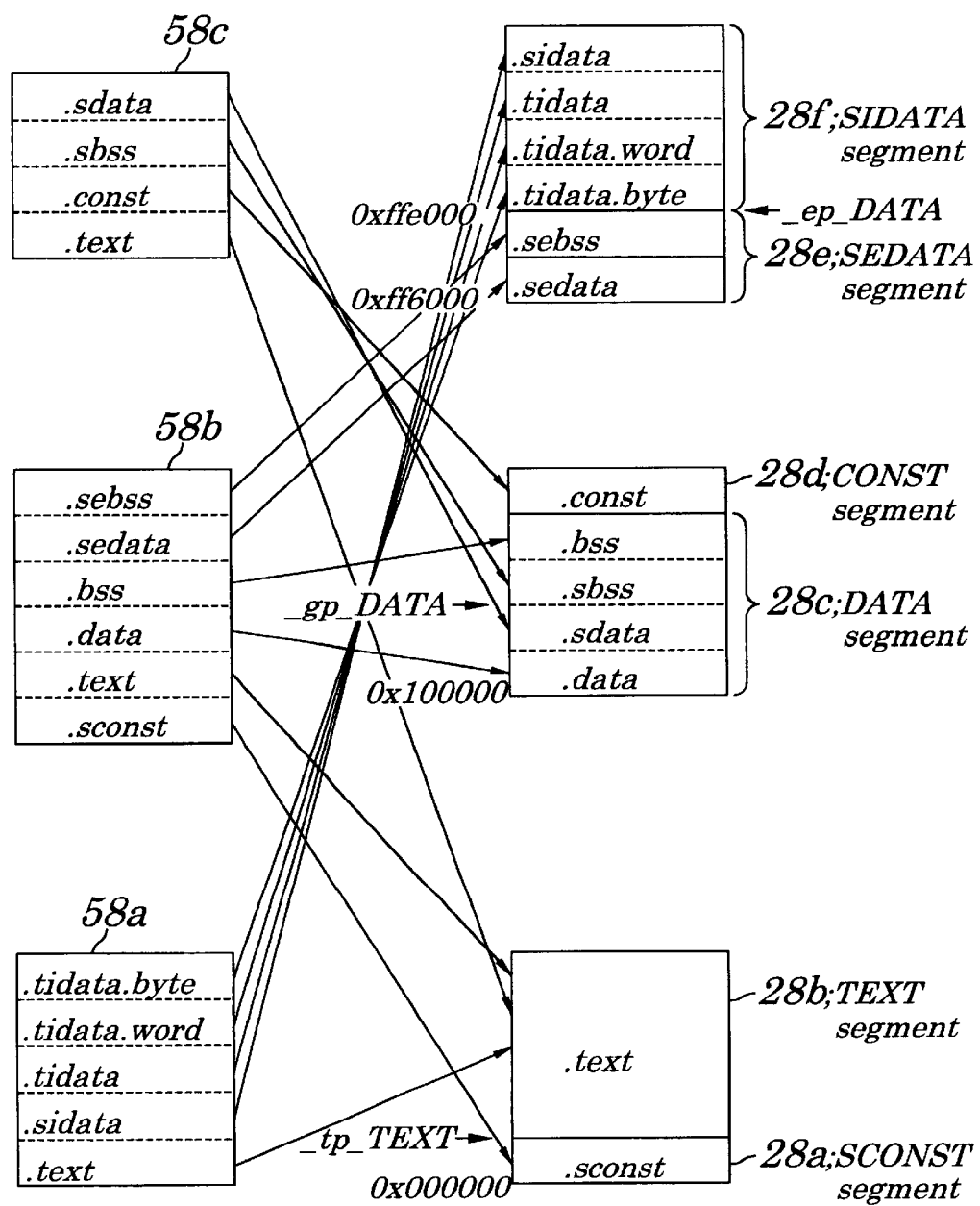
FIG. 17 is a view illustrating the concepts of the link processing when the program of a microcomputer is developed.

FIG. 1 is a block diagram schematically illustrating the construction of a program developing device for use in a method of preparing an LDF being a preferred embodiment according to the present invention; FIG. 2 is a view illustrating the construction of memory arrangement information stored in a device file constituting the program developing device of FIG. 1; FIG. 3 is a view exemplarily illustrating segment arrangement information stored in LDF data holding means constituting the program developing device; FIG. 4 is a view illustrating a memory image where default LDF data visually displayed on a display device; FIG. 5 is a view illustrating a memory image where the LDF data after link processing in the present embodiment is visually displayed on a display device; FIG. 6 is a flowchart schematically illustrating a method of displaying a memory image on a display 4 in the present embodiment;

FIG. 7 is a flow chart schematically illustrating a sequence where alteration and verification of data are performed in the present embodiment;

FIG. 8 is a view schematically illustrating the construction of the program making device; FIG. 9 is a flowchart schematically illustrating the method of making the LED; FIG. 10 is a view exemplarily illustrating a source file list using the method of making the LDF; FIG. 11 is a view exemplarily illustrating an assembly source file indicating contents in an object file, used for the method of making the LDF;

FIG. 12 is a view exemplarily illustrating a link directive file made by the same method; FIG. 13 is a view illustrating a relationship between the LDF data and link processing operation in the same method; and FIG. 14 is a flow chart illustrating a method of automatically making LDF data in the same method.

As illustrated in FIG. 8, a program making device 10 in the present embodiment comprises an LDF making section 71, a program making processing section 72, a device file 1, and an LDF 2. The device file 1 and the default LDF2 are previously made by a microcomputer maker and are provided to the programmer 5. The LDF making section 71 comprises an LDF making tool 8, a display 4, and input means 6, which section makes LDF data required for linking. The LDF making tool 8 displays memory disposition information, names, sizes, and address information of segments and sections disposed in a memory space, and the like on the display 4 based upon the device file 1 and the LDF2. The LDF making section 71 edits names of segments and sections, and size and address information, and the like based upon an instruction of the programmer 5, and writes edited LDF data into the LDF2.

Since the program making processing section 72 is substantially the same as the prior art program making processing section 74, the detailed description thereof will be omitted. The prior art program making processing section 74 is different from the present program making processing section 72 in that the LDF making tool 8 can directly receive the execute form file 3 made n the linker 7. As a result, the LDF making tool 8 can not only make the LDF data, but also analyze the LDF data of the execute form file 3 to display information such as names, sizes, and addresses of actually made segments and sections on the display 4, and to edit the information and write back it into the LDF2. It is noticed here that the number of the source files 55a to 55c and the number of the object files 58a to 58c are not limited to three. Further, when the linking is performed, a library file, and the like maybe linked.

In the following, referring to FIG. 9, the LDF making method will be schematically described. In the first place, in step S31, the programmer 5 actuates the program development device 10. Then, in step S32, the LDF making tool 8 reads the device file 1 and the LDF2 corresponding to a predetermined microcomputer based upon an instruction of the programmer 5, and displays a memory image on the display 4. The LDF making tool 8 can further read the execute form file 3 for which the linking is finished, and display the same information. The programmer 5 inputs information such as names, sizes, and addresses of new segments and sections, and alters known information, looking at known information.

Then, in step S33, the LDF making tool 8 judges whether or not varieties of information inputted by the programmer 5 satisfies a predetermined rule. For example, when a segment is too large in the size and swells out of a memory area possessed by the microcomputer, the operation advances to NO, and returns to the processing in step S32 for correction processing.

Oppositely, when the varieties of information satisfy the rule, the operation advances to YES for a processing in step S34. In step S34, the LDF making tool 8 automatically makes the LDF data in updated contents, and stores it in the LDF2, and finishes the processing.

As illustrated in FIG. 1, the program development apparatus 10 comprises a device file 1 for storing memory information such as addresses and sizes of a memory concerning each microcomputer, an LDF2 previously prepared (until previous time) to store the LDF data, an execute form file 3 for storing an execute form program, a display 4 for displaying a memory image and the like, input means 6 operated by the programmer 5 to input necessary information, a linker 7 for making the execute form file 3, and a link directive file making tool (hereinafter referred to an LDF making tool) 8.

The LDF making tool 8 comprises device file read means 11, execute form analysis means 12, execute form analysis data .LDF data integration means 13, LDF read means 14, LDF making means 15, memory image display means 16, memory disposition information data holding means 17, LDF data holding means 18, default LDF data holding means 21, LDF syntax verification means 19, and data edit means 20.

The device file 1 stores, as illustrated in FIG. 2, memory disposition information, register information, and input/output port information and the like, all supplied by amicrocomputer maker. The information in the device file 1 is read by the device file read means 11, and is stored in the memory disposition information data holding means 17. The memory image display means 16 displays on the display 4 memory disposition information stored in the memory disposition information data holding means 17, and segment information and section information disposed in the memory disposition information. The default LDF data holding means 21 stores default LDF data supplied by a microcomputer maker, and further stores standard segment information and section information for each type of microcomputers, and information such as disposition addresses and sizes of the former information. The information is previously stored in the LDF making too 8. However, when a program of a microcomputer not stored in the LDF making tool 8 is developed, the programmer 5 can store new default LDF data in the default LDF data holding means 21 through the LDF read means 14.

The LDF data holding means 18 stores segment information and section information, and information such as disposition addresses and sizes of the former information. The segment information and section information are ones created by operating the input means 6 and the data edit means 20 while observing the display 4 by the programmer 5 or information obtained by integrating the LDF execute form analysis data obtained by the execute form analysis data LDF data integration means 13 through analysis of the execute form file 3 and the LDF data stored in the LDF data holding means 18.

The LDF making means 15 outputs the segment information and the section information, both stored in the LDF data holding means 18, and the information such as disposition addresses and sizes of the former information to the LDF2 for their storage therein. The LDF read means 14 reads the LDF2 already made and stores it in the LDF data holding means 18. The programmer 5 can edit the LDF data as in the above description. The data edit means 20 adds, alters, and deletes any segment and any section in the LDF data holding means 18 based upon an instruction of the programmer 5. For example, the data edit means 20 edits names, sizes, start addresses, and a disposition order of the segments and sections.

The LDF syntax verification means 19 verifies whether or not the LDF data stored in the LDF data holding means 18 is created in conformity with a predetermined rule, and if not, then it outputs syntax error. For example, when an instruction code is disposed at an address where no memory is existent, the LDF syntax verification means 19 displays syntax error in a dialog 9 area on the display 4.

The linker 7 performs linking of the object files 58a to 58c following the created LDF2 to create the execute form file 3, and stores it. The execute form file 3 is an execute form program file linked by the linker 7 based upon the LDF2 and the object files 58a to 58c. Herein, since the sizes of an actual instruction code and variable data have been calculated, sizes and start addresses of each segment and each section are clarified from the segment information and the section information.

The execute form analysis means 12 reads and analyzes the execute form file 3 to create LDF execute form analysis data corresponding to actual use conditions of the memory. The execute form analysis data LDF data integration means 13 integrates the LDF execute form analysis data and the LDF data stored in the LDF data holding means 18, and stores integrated data in the LDF data holding means 18. The segment information and the section information, and information of disposition addresses of the former are displayed on the display 4 with use of the memory image display means 16.

It is herein noticed that prior to the integration the LDF data holding means 18 has held the LDF data used when the execute form file 3 is created, and utilizes for the integration information not included in the execute form file 3, e.g., information such as segment names and section names.

FIG. 2 exemplarily illustrates contents of the memory disposition information. Since the memory disposition information is different depending upon the types of microcomputers, it is necessary that the device file read means 11 reads device information concerning a microcomputer used through the external device file 1 and stores it in the memory disposition information data holding means 17.

As illustrated in the same figure, the memory disposition information includes information such as types and addresses of memories contained in the microcomputer and connected with the outside. In the embodiment illustrated in FIG. 2 the microcomputer includes an internal ROM 25, an external RAM 26, and an internal RAM 27 as memories. As the memory disposition information there are start addresses 25a, 26a, 27a and end addresses 25b, 26b, 27b in the internal ROM 25, external RAM 26, and internal RAM 27. Addresses between the internal ROM 25 and the external RAM 26, and the internal RAM 27 are not necessarily continuous, but there may be an area where no memory is existent.

FIG. 3 exemplarily illustrates the segment disposition information stored in the LDF data holding means 18. The segment disposition information includes segment disposition information 68, section disposition information 69, and symbol information 67, which are made by analyzing the LDF2.

Hereinafter, these informations 67 to 69 are described as directive information as a whole.

In the segment disposition information 68, a plurality of segment disposition informations 68a to 68f constituting the LDF2 are arranged like a chain. The segment disposition information 68a to 68f are communicated with section disposition information 69a to 69e with each other, and the section disposition information are also communicated.

Arrows in FIG. 3 indicate pointers. These pointers indicate head addresses in storage areas of the successive segment disposition informations 68b, 68c, . . . , or the disposition information section 69d to which the segments 68a, 68b, . . . , or the section disposition information 69c are connected. For example, the segment disposition information SCONST 68a includes a pointer indicative of a start address of data in which the next segment disposition information TEXT 68b are stored, and a pointer indicative of a start address of data in which section disposition information ". sconst" is stored.

The LDF making tool 8 can reach the predetermined segment disposition information 68 or the predetermined section disposition information 69 by following a chain of the pointers, whereby necessary segment/section disposition information is read and written.

Each segment disposition information 68a to 68f includes a start address of each segment 28a to 28f (FIG. 12), a start address of the next segment disposition information 68 (hereinafter referred to an NSG address.), and a start address of the next section disposition information 69 (hereinafter referred to an NSC address.). Each section disposition information 69a to 69e likewise includes a start address of each section (FIG. 12), and an NSC address, and the like. Further, segment disposition information 68f and section disposition information 69a, 69b, 69d, 69e at the last of the connection have "NULL" values at the NSG address and at the NSC address.

When a new segment SEG28g (not shown) is added, new segment disposition information 68g (not shown) is added, and is linked with segment disposition information 68f. Hereupon, a start address of the new segment SEG28g is written in the new segment disposition information 68g, and the NSG address of the segment disposition information 68q written as a "NULL" value, and further a start address of an area where the new segment disposition information 68g is stored is written. The NSG address of the new segment disposition information 68g, since nothing has been written therein, is kept "NULL".

The symbol information 67 includes address information such for example as the aforesaid pointer symbol, e.g., a text pointer symbol tp_TEXT, a global pointer symbol gp_DATA, an element pointer symbol ep_DATA, and the like.

FIG. 4 is a view exemplarily illustrating a screen displayed on the display 4 while referring by the memory image display means 16 to the memory disposition information (FIG. 2) stored in the memory disposition information data holding means 17 and the LDF data stored in the default LDF data holding means 21, i.e., an initial state of the LDF data is displayed.

The display 4 can display a plurality of windows 4a, 4b, and a screen of the window 4a displays segment information as a memory image 30 while a screen of the window 4b displays section information of a certain segment as a selection memory image 32.

On the memory images 30, 32 there are displayed the kinds of memories disposed in a memory space of a microcomputer, and a start address and an end address of each memory. The memory images 30, 32 include a plurality of rectangular segment display areas, and in the rectangular information there are displayed a segment name or a section name, and a start address of the segment or the section. For example, in a memory area of the internal ROM 25 there are displayed segment names "SCONST" and "TEXT". When the memory images 30, 32 are created anew, actual start addresses and sizes of the segment and the section are unclear, so that in the present example there are displayed only start addresses (0x000000) for any case. The programmer 5 can grasp address information for each microcomputer by looking at such memory images 30, 32 created anew, and hence he can use the information as a reference when he instructs memory disposition of a microcomputer program.

The selection memory image 32 can display a predetermined position of the displayed memory image 30 on another window 4b of the display 4 by designating that position with the input means 6. More specifically, when the programmer 5 wants to look at a section being a lower rank hierarchy by selecting a partial segment on the memory image 30, e.g., when the segment "DATA" is selected, the selection memory image 32 can be displayed as illustrated in FIG. 4 by clicking a displayed part with the input means 6. Even in this case, although a start address corresponding to a start address (0x100000) of the external RAM is displayed, an actual start address and size are unclear, and hence an end address is not displayed.

The internal ROM 25 has a start address (0x000000) and an end address(ox007fff), and includes two segments SCONST 28a and TEXT 28b. Start addresses of the segment SCONST 28a and the segment TEXT 28b are (0x000000) in the initial status. A pointer tp corresponds to a text pointer symbol tp_TEXT illustrated in FIG. 12, which points to a head address of the segment TEXT 28b.

The external RAM 26 has a start address (0x100000) and an end address (0xffdfff), and includes three segments DATA 28c, CONST 28d, and SEDATA 28e.

The end address (0xffdfff) is adjacent to a start address of the internal RAM 27, so that the end address is not displayed on the screen, but can be displayed. Start addresses of the segments DATA 28c and CONST 28d are (0x100000) in the initial state, and a start address of the segment SEDATA 28e is (0xff6000). A pointer gp corresponds to a global pointer symbol gp_DATA illustrated in FIG. 12, which pointer points to an intermediate address between a section ". sbss" and a section ". sdata" of the data segment.

A window 4b of the selection memory image 32 indicates that a section in the segment DATA 28c includes four sections ". bss", ". sbss", ". sdata", and ". data", and a start address in the initial state is (0x100000). The internal RAM 27 has a start address (0xffe000) and an end address (0xffe3ff), and includes one segment SIDATA 28f. A start address of the segment SIDATA 28f is (0xffe000) in the initial status.

The memory disposition information corresponding to the type of a microcomputer is displayed on the display 4 as memory images 30, 32 with the aid of the memory image display means 16 as described above, whereby the programmer 5 can visually immediately recognize the memory disposition information without searching a position of description on a manual, and the like.

FIG. 5 is a view exemplarily illustrating screens where memory images 31, 33 are displayed on the windows 4a, 4b of the display 4 when the execute form file 3 is inputted during creation or after the making with the LDF creation. The memory images 31, 33 are ones where the memory disposition information (FIG. 2) stored in the memory disposition information data holding means 17 and the memory disposition information analyzed in its execute form file 3 with the execute form analysis means 12, integrated with the execute form analysis data. LDF data integration means 13 and stored in the LDF data holding means 18 are displayed on the display 4 with the aid of the memory image display means 16. FIG. 5 concretely illustrates start addresses and end addresses of segments and sections actually disposed in a memory differently from FIG. 4. Screens to be displayed are not limited to those in FIG. 5, and each segment or start addresses and sizes may be displayed additionally to those of FIG. 5. Further, the memory image 30 and the selection memory image 32 may be displayed on the same window.

In the following, there will be described a method of displaying the LDF 2 on the display 4.

FIG. 6 is a flow chart schematically illustrating a method of displaying the memory image on the display 4. The display of the memory image 30 is achieved by comparing the memory disposition information 25 to 27 and the LDF data. In the state where nothing is displayed on the screen of the display 4 the programmer 5 actuates the LDF making tool 8. The LDF making tool 8 executes the following processings by the control of a memory image display program. First, in step S10 in FIG. 6 the programmer 5 selects the type of a microcomputer to be developed among many types of microcomputers with use of the input means 6. The device file read means 11 in the LDF making tool 8 reads the selected device file 1, and stores the memory disposition information in the device file 1 in the memory disposition information data holding means 17. The memory disposition information has contents illustrated in FIG. 2.

Then, in step S11, when the LDF data is firstly made, the programmer 5 selects the LDF data of a microcomputer to be developed among the LDF data stored in the default LDF data holding means 21 with use of the input means , and stores it in the LDF data holding means 18. In contrast, when there is existent the LDF data already made, the programmer 5 selects the LDF data whereby the LDF read means 14 reads the LDF data selected from the LDF 2, which data is stored in the LDF data holding means 18. The memory image display means 16 extracts directive information illustrated in FIG. 3 from the LDF DATA (FIG. 12). Then, in step S12, the memory image display means 16 judges whether or not the directive information to be processed next is left behind in the LDF data holding means 18. When there is no directive information to be processed (FIG. 3), the LDF making tool 8 advances to NO for processing in step S18. In contrast, when there is left behind the directive information, the LDF making tool 8 advances to YES for processing in step S13.

In step S13, the memory image display means 16 judges whether or not a start address of a segment 68 in the directive information is smaller than that of the memory disposition information with reference to the LDF data holding means 18 and the memory disposition information data holding means 17.

The memory image display means 16 has a memory disposition information pointer that points to a predetermined position of the memory disposition information illustrated in FIG. 2 and an SEG pointer that points to a predetermined position of the directive information illustrated in FIG. 3, and in the initial state either pointer points to a left end of the figure. When a start address of a segment pointed by the SEG pointer is smaller than an address of the memory disposition information pointed by the memory disposition information pointer, the LDF making tool 8 advances to YES for processing in step S16. If a former start address of a segment pointed by the SEG pointer is equal to or larger than a latter address, the LDF making tool 8 advances to NO for processing in step S14. In step S14, the memory image display means 16 obtains an address memory name of the memory disposition information pointed to by the memory disposition information pointer, and start address or end address information, and displays them on the display 4.

In step S15, the memory image display means 16 increments the memory disposition information pointer to cause the pointer to point to a position shifted by one to the right. Thereafter, the LDF making tool 8 returns to step S12 to repeat the like processing. In contrast, when the LDF making tool 8 advances to YES in step S13, in step S16 the memory image display means 16 obtains a start address and a name of a segment pointed by the SEG pointer from the LDF data holding means 18, and displays these information on the display 4.

Then, in step S17, the memory image display means 16 increments the SEG pointer to cause the pointer to point to a position shifted by one to the right in FIG. 3. Thereafter, the LDF making tool 8 returns to step S12 to repeat like processing. The processing is repeatedly executed until the directive information disappears, i.e., the NSG address becomes "NULL".

In contrast, when the LDF making tool 8 advances to NO in step S12, in step S18 the memory image display means 16 judges with reference to the memory disposition information data holding means 17 whether or not the memory disposition information to be processed is existent. When there is no memory disposition information to be processed, the LDF making tool 8 finishes the processing. When there is left behind the memory disposition information to be processed, the LDF making tool 8 advances to step S19.

In step S19, the memory image display means 16 obtains an address and a memory name of the memory disposition information pointed to by the memory disposition information pointer from the memory disposition information data holding means 17, and start and end information, and displays the information on the display 4. In step S20, the memory image display means 16 increments the memory disposition information pointer to cause the pointer to point to a position shifted by one to the right in FIG. 2. Thereafter, the LDF making returns to step S18 where like processing is repeated until the memory disposition information data is exhausted.

In the following, there will be described an example of concrete operation in FIG. 6 with reference to FIGS. 2, 3, and 4. Herein, there will be described a situation where default LDF data provided by a microcomputer maker is displayed. Firstly, in steps S10, S11 in FIG. 6, the memory disposition information data illustrated in FIG. 2 and data information illustrated in FIG. 12 are assumed to be read. In this stage, the memory disposition information pointer points to the internal ROM START 25*a* (FIG. 2), and the SEG pointer points to the segment SCONST 68*a* (FIG. 3).
"Display of Memory Disposition Information and Internal ROM START"

In step S12, since there is the directive information, the LDF making tool 8 advances to YES. In step S13, the memory image display means 16 compares a start address (0x000000) of the segment SCONST 68*a* pointed to by the SEG pointer and an address 0x000000) of the internal ROM START 25*a* pointed to by the memory disposition information pointer. Since these addresses are equal to each other, the LDF making tool 8 advances to NO for processing in STEP S14. In step S14, the memory image display means 16 obtains an address and a memory name and start and end information of the memory disposition information pointed to by the memory disposition information pointer from the memory disposition information data holding means 17, and displays "0x000000 (internal ROM START) on the display 4.

In step S15, the memory image display means 16 increments the memory disposition information pointer to cause the pointer to point to the internal ROM END 25*b* shifted by one to the right in FIG. 2. An address of the memory disposition information pointed to by the memory disposition information pointer is (0x007fff). Thereafter, the LDF making tool 8 returns to step S12.
"Display of Segment SCONST"

Since in step S12, there is the directive information to be yet processed, the tool 8 advances to YES for processing in step S13. Instep S13, the memory image display means 16 compares a start address (0x000000) of the segment SCONST 68*a* pointed to by the SEG pointer and an address (0x007ff) of the internal ROM END 25*b* pointed to by the memory disposition information pointer. Since the former start address is smaller than the latter address, the LDF making tool 8 advances to YES for processing in step S16. In step S16, the memory image display means 16 obtains an address, segment name, and size of the segment SCONST 68*a* pointed to by the SEG pointer from the LDF data holding means 18, and displays "SCONST 0x000000" on the display 4. Since the size is unclear, an end address is not displayed. Instep S17, the memory image display means 16 increments the SEG pointer to cause the SEG pointer to point to the segment TEXT 68*b* positioned to the right by one in FIG. 3. A start address of the segment TEXT 68*b* pointed to by the SEG pointer is (0x000000). Thereafter, the LDF making tool 8 returns to step S12. "Display of Segment TEXT"

Since in step S12 there is left behind the directive information to be yet processed, the LDF making tool 8 returns to YES for processing in step S13. In step S13, the memory image display means 16 compares a start address (0x000000) of the segment TEXT 68*b* pointed to by the SEG pointer and an address (0x007fff) of the internal ROM END 25*b* pointed to by the memory disposition information pointer. Since the former address is smaller than the latter, the LDF making tool 8 advances to YES for processing in step S16.

In step S16, the memory image display means 16 obtains an address, segment name, size of the segment TEXT 68*b* pointed to by the SEG pointer from the LDF data holding means 18, and displays "TEXT 0x000000" on the display 4. Since the size is unclear, an end address is not displayed. Instep S17, the memory image display means 16 increments the SEG pointer to cause the pointer to point to the segment DATA 68*c* shifted by one to the right in FIG. 3. An address of the segment DATA 68*c* pointed to by the SEG pointer is (0x100000). Thereafter, the LDF making tool 8 returns to step S12.
"Display of Internal ROM END"

Since in step S12 there is the directive information, the LDF making tool 8 advances to YES. Instep S13, the memory image display means 16 compares a start address (0x100000) of the segment DATA 68*c* pointed to by the SEG pointer and an address (0x007fff) of the internal ROM END 25*b* pointed to by the memory disposition information pointer. Since the former address is larger, the LDF making tool 8 advances to NO for processing in step S14.

In step S14, the memory image display means 16 obtains an address, memory name, distinction between start/end of the memory disposition information pointed to by the memory disposition information pointer from the memory disposition information data holding means 17, and displays "0x007fff (internal ROM END)" on the display 4.

In step S15, the memory image display means 16 increments the memory disposition information pointer to cause the pointer to point to the external RAM START 26a shifted by one to the right in FIG. 2. An address of the memory disposition information pointed to by the memory disposition information pointer is (0x100000). Thereafter, the LDF making tool 8 returns to step S12. Like processings are repeated thereafter to display "DATA 0x100000", "CONST 0x100000", "SEDATA 0xff6000", and "0xffdfff (external RAM END". In this status, the SEG pointer points to an address (0xffe000) of the segment SIDATA 68f, and the memory disposition information pointer points to an address (0xffe000) of the internal RAM Start 27a.

"Display of Memory Disposition Information and Internal RAM START"

After the operation advances as: step S12--S13--S14, in step S14 the memory image display means 16 obtains an address, memory name, a distinction between start/end of the memory disposition information pointed to by the memory disposition information data holding means 17 or the memory disposition information pointer, and displays "0xffe000 (internal RAM START)" on the display 4. Since the internal RAM START 27a address and the external RAM END 26b address are adjacent to each other and are overlapped on the display 4, in FIG. 4 there is illustrated an example where the external RAM END 26b address is not displayed. However, it is possible that the internal RAM START 27a address and the external RAM END 26b address are displayed adjoining to each other. Hereinafter, like processings are repeated to display "SIDATA 0xffe000", "0xffe3ff (internal RAM END)", and (0xffffff) being a final address of the address space possessed by a microcomputer, and the processings are finished.

The memory image display means 16 displays pointer information tp, gp, and ep described in the LDF data holding means 18 with use of a processing not illustrated in FIG. 6. Further, one of a plurality of segments displayed on the display 4 is selected by the input means 6 whereby it is possible to display the section information on another window with a processing not illustrated in FIG. 6. FIG. 4 illustrates an example where the segment DATA is selected to display section names ". bss", ". sbss", ". sdata", ". data" in the segment DATA, and a start address (0x100000) of these sections on the selection memory image 32.

The programmer 5 can visually look at the memory disposition information and the directive information corresponding to a microcomputer being an object to be developed as the memory image 30 so that there is eliminated the need of searching a page described on a manual, and hence address information of a predetermined microcomputer can be grasped in a short time.

In the following, there will be described an example where the link directive file is made from the memory image execute form file 3. The device file read means 11 and the LDF read means 14 in the LDF making tool 8 read the device file 1 and the LDF 2 respectively to extract the memory disposition information and the directive information and store them in the memory disposition information data holding means 17 and the LDF data holding means 18. The execute form analysis means 12 reads the execute form file 3 to analyze actual conditions of the use of the memory. The execute form analysis data -LDF data integration means 13 integrates the resulting LDF data and the LDF data possessed by the LDF data holding means 18 and stores the resulting data in a predetermined area in the LDF data holding means 18. The memory image display means 16 outputs the aforementioned information to the display 4 by executing the aforementioned step, and displays the execute form memory image 31 illustrated in FIG. 5.

The memory image 31 provides a start address and an end address of a concrete segment since the actual memory size is known as clarified from comparison with the initial memory image 30 (FIG. 4). For example, in the address space in the internal ROM the segments "SCONST" and "TEXT" are displayed in concrete sizes. More specifically, the segment TEXT is disposed in the memory space located between the start address (0x000000) and the end address (0x004e85).

When it is wanted to look at detailed information of the segment DATA for example on the memory image 31, the selection memory image 33 can be displayed as illustrated in FIG. 5 by clicking a displayed portion of the segment DATA with the input means 6. In this case, since the actual size is known, not only a start address (0x100000) and an end address (0x11049b) of the segment DATA but also the lower rank segment information are displayed on the selection memory image. It is found that in the memory image 33 the section ". data" for example is disposed in the memory space between the start address (0x100000) and the end address (0x10000b).

The programmer 5 can visually grasp memory disposition information, and an actual size and a disposition location of a memory for each microcomputer by looking at the memory images 31, 33 displayed visually. For this, the programmer 5 can grasp these informations in a short time compared with a case where a program is developed looking at a manual and the like, and can easily edit contents of the program. For example, since concrete memory disposition information in the address space and the size of the information are clarified with reference to the memory image 31 (FIG. 5), the programmer 5 can easily achieve edit processing such as addition, alteration, and deletion of the segments and sections by operating the input means 6. The programmer 5 may also move a predetermined segment and section to another area while looking at the memory image 33 already made. The LDF data edited as such is held in the LDF data holding means 18, and after the editing is finished, the LDF making means 15 renders the LDF 2 to SAVE processing for holding it. Since the LDF syntax verification means 19 checks contents of alteration by updating contents in the memory image 31, verification of the LDF is achieved even if the link processing is not executed.

FIG. 7 is a flow chart schematically illustrating an edit/verification sequence. Instep S21, the programmer 5 operates the input means 6 to input an input value such as the size of a segment name and a start address into a dialog 9 area on the display 4. The data edit means 20 reads the input value from the dialog 9.

In the following, editing of a segment will be exemplarily described. The data edit means 20 returns the SEG pointer that points to a segment name to an initial status. For example, in FIG. 3, the SEG pointer is positioned to the segment SCONST 68a upon editing a segment.

Then, in step S22, the data edit means 20 copies the input value into a register for temporarily holding information. In step S23, the data edit means 20 compares a segment name and a segment name (FIG. 3) held in the LDF data holding means 18 in the copied input value, and searches a position where the segment name is coincident with an existing name. When the same name as the input segment name is found, the data edit means 20 advances to YES for processing in step S25. Oppositely, when the input segment name and the name pointed to by the pointer are not coincident, the data edit means 20 advances to NO for processing in step S24. In step S24, the data edit means 20 increments by one the SEG pointer that points to a segment name. For example, when in FIG. 3, the data edit means 20, after finishing the compare processing with the segment SCONST 68a, increments the SEG pointer to the right in FIG. 3 for the compare processing with the segment TEXT 68b.

In step S23, when the input segment name is coincident with the segment name held in the LDF data holding means 18, the data edit means 20 advances to processing in step S25. In step S25, the data edit means 20 adds a size to a start address of the original segment based upon the size information in the input value to obtain an end address.

The LDF syntax verification means 19 judges whether or not the obtained end address is larger than an end address (limit value) of a predetermined memory. If the obtained end address is larger than the limit value, the LDF making tool 8 advances to YES for processing in step S27, while if the end address is smaller than the limit value, the LDF making tool 8 advances to NO for processing in step S26.

Instep S26, the data edit means 20 rewrites associated segment data in the LDF data holding means 18 based upon the input value held in the register.

In contrast, in step S27, the data edit means 20 displays an error message that the altered data exceeds the limit value. The programmer 5 repeats the processings in steps S21 to S27 for correction processing. The processings of the edit/verification sequence are finished as described above. Although in the aforesaid description, the example to edit and update the segment was described, a situation with the section is likewise processed. When new segment and section are added, a window (not shown) for addition work is displayed on the display 4 by clicking an addition button (not shown) displayed in the dialog 9.

The programmer 5 can add a new segment and a new section to the segment/section disposition information in FIG. 3 by inputting predetermined information into the window. Also when already input segment and section are deleted, a predetermined segment or section displayed in the memory images 30 to 33 is selected, and is deleted from the segment/section disposition information by clicking a delete button (not shown) displayed in the dialog 9.

FIG. 13 indicates a distinction between the link processings when the LDF is designated and not designated. FIG. 13(a) indicates a result of the link processing where the section ". text" is linked based upon the default LDF data. In the same figure, the three object files 58a to 58c have the same name ". text". The linker 7 processes these object files based upon the default LDF data into the segment TEXT 28b in one execute form file. Since a disposition position after the link processing is not particularly designated, the linker 7 links the respective sections ". text" in the order where the object files 58a to 58c are incorporated. For this, the programmer 5 can not predict where the respective sections ". text" of the object files 58a to 58c are disposed. For example, when address intervals with respect to the object files 58a to 58c are separated, and there frequently happen instructions to jump between the object files 58a to 58c, proximity jump instructions are not used, so that instructions having long code sizes are obliged to be used, whereby execute time of a program is prolonged.

Further, when the size of linked three sections ". text" becomes too large to be contained in the high speed internal ROM, a part of the section ". text" is disposed in a lower speed external memory than the internal ROM (FIG. 13(a)).

The external memory generally has longer access time than the internal ROM, so that provided the section ". text" of a program not frequently accessed is disposed in the lower speed external memory, an execution speed of the program is lowered. FIG. 13(b) illustrates a result of the link processing based upon the LDF data altered by the processing illustrated in FIG. 7. The programmer 5 is assumed to click the addition button displayed in the dialog 9 area on the display 4 to previously input new segment names TEXT1" to "TEXT3" and attributes of the same.

As a result, the LDF data is made to provide the memory image in FIG. 13(b).

Thereafter, the made LDF data is stored in the LDF 2. In contrast, the programmer 5 alters the section names "text" in the object files 58a to 58c to ". text2", ". text3", ". text1".

The linker 7, after executing the link processing based upon the LDF 2, links the respective sections in the object files 58a, 58b, 58c in the order of ". text1", ". text2", ". text3". The result is illustrated in FIG. 13(b) 28b. Since as described above the respective section names ". text1", ". text2", ". text3" can be linked in the order of designation thereof based upon the LDF 2, the sections ". text1", ". text2" frequently accessed can be disposed in the high speed internal ROM, and the section ". text3" not frequently accessed can be disposed in the low speed external memory. Thus, performance such as an execution speed of a program can be improved.

FIG. 14 is a flow chart schematically illustrating a method of outputting the LDF data to the LDF 2, in which there will be described a method of automatically making the LDF2 on the basis of edited directive information.

In step S41 in FIG. 14, the LDF making means 15 initializes the SEG pointer that points to the segment in the directive information (corresponding to FIG. 3) held in the LDF data holding means 18, and positions it to segment SCONST 68a located upper left in FIG. 3. In step S42, the LDF making means 15 judges whether or not there is segment information to be processed in the LDF data holding means 18. The LDF making means 15 advances to YES for processing in step S43 if there is the segment information, but if not, then the LDF making means 15 advances to NO for processing in step S49.

In step S43, the LDF making means 15 reads segment information pointed to by the SEG pointer from the LDF data holding means 18, converts it to a predetermined format, and outputs information such as a segment name, a start address, and a size to the LDF 2. In step S44, the LDF making means 15 initializes a section pointer (hereinafter referred to as a SEC pointer.) so as for the pointer to point to a first section next to the segment during the processing. For example, when in FIG. 3 the SEG pointer points to the segment DATA 68c, the pointer is positioned to the SEC pointer section ". bss". Instep S45, the LDF making means 15 judges whether or not there is any section information next to the segment during the processing in the LDF data holding means 18. The LDF making means 15, if there is the section information, advances to YES for processing in step S46, and if there is no section information, the LDF making means 15 advances to NO for processing in step S48. In step S46, the LDF making means 15 reads section information pointed to by the SEC pointer from the LDF data holding means 18, converts it to a predetermined format, and outputs information such as a section name, a start address, and a size to the LDF 2.

In step S47, the LDF making means 15 increments the SEC pointer to cause the printer to point to the next section. For example, when the SEC pointer points to the section ". bss" in FIG. 3, the pointer is positioned to the section ". data" shifted by one to the right. Thereafter, the LDF making means 15 repeats the steps S45 to S47, and if there is no section next to the section ". data", the LDF making means 15 advances to a processing in step S48. Instep S48, the LDF making means 15 increments the SEG pointer to cause the pointer to point to the next segment. For example, when in FIG. 3 the SEG pointer points to the segment SCONST 68a, the pointer is positioned to the segment TEXT 68b shifted by one to the right. Thereafter, the LDF making means 15 repeats the steps S42 to S48, and if there is no segment to be pointed, the LDF making means 15 advances to a processing in step S49. In step S49, the LDF making means 15 outputs the symbol information 67 (FIG. 3) to the LDF 2 for finishing the LDF output processing. The LDF making tool 8 can automatically make the LDF 2 based upon the directive information by executing the above described processings.

According to the construction of the present embodiment, as described above, memory disposition information concerning at least each individual microcomputer is read from the device file 1, and further default LDF data for each microcomputer or an already made LDF and an execute form file 3 are read whereby memory images 30 to 33 are visually displayed on a display.

Accordingly, memory disposition and segment and section disposition for each microcomputer can be visually simply grasped. Therefore, when the segment and section information displayed in the memory images 30 to 33 is altered, contents of the information can be altered while looking at these memory images 30 to 33. Thus, even though a description rule for conventional LDF data (FIG. 12) is unknown, the LDF 2 can be automatically made. Hereby, there is facilitated development of a program which has satisfactory efficiency of the use of the memory and which is fitted to memory disposition of a microcomputer.

Further, when any segment and/or any section is added and/or altered, the LDF making tool 8 verifies on the basis of the made LDF data whether or not the addition and/or the alteration is possible. Accordingly, the addition and/or the alteration can be verified without the need of link processing differently from the prior art, and hence verification time can be sharply reduced. The LDF can be made dialogically using the LDF making tool 8.

It is therefore unnecessary to search a description position in a manual and to know well limitation conditions, etc.

There is eliminated the need of reliance on the skilled programmers, and less experienced programmers can improve the efficiency of LDF making work. Further, when a programmer makes the LDF data, there is eliminated such a trouble as the programmer failing to know described items in a manual to cause mistaken description of the LDF.

Although the preferred embodiment of the present invention was described in detail, concrete construction is not limited thereto, and any alteration of a design in the present invention without departing the scope of the present invention should be included in the present invention. For example, the present invention is not limited to development of a program for a microcomputer but is applicable to all information processing apparatuses including upper level computers than microcomputers. The directive data read from the LDF and displayed on a display is only an example and is not limited thereto. Further, a combination of memories constituting a microcomputer is only an example and is not limited thereto, which may be altered at need.

According to a method of making an LDF of the present invention and a tool for making an LDF, as described above, a memory image is visually displayed on a display and therefore the memory image of a microcomputer can be simply grasped.

Accordingly, contents in information of a part on a memory image which part is needed to be altered can be altered, and the LDF can be automatically made by updating the memory image.

The LDF can be automatically made without relying on a skilled programmer to improve work efficiency.

It is thus apparent that the present invention is not limited to the above embodiments but may be changed and modified without departing from the scope and spirit of the invention.

Finally, the present invention claims the priority of Japanese Patent Application No. Hei10-080898 filed on Mar. 27, 1998, which is herein incorporated by reference.

What is claimed is:

1. A method of making a link directive file, the file being used for link processing where a plurality of object files are linked into an execute form file and disposing instruction codes and variable data in a memory space, comprising the step of:

visually displaying said link directive file as a memory image.

2. A method of automatically making a link directive file according to claim 1, wherein:

a plurality of kinds of memories are disposed in said memory space, and kinds and start addresses of said memories are displayed in the order of addresses of said memories.

3. A method of making a link directive file according to claim 2, wherein:

said execute form file includes a plurality of different attribute segments, and names of said segments and start addresses of said segments are displayed in the order of the addresses in said memory space.

4. A method of making a link directive file according to claim 1, wherein:

said execute form file includes a plurality of different attribute segments, and names of said segments and start addresses of said segments are displayed in the order of the addresses in said memory space.

5. A method of making a link directive file according to claim 4, wherein:

each said segment includes a plurality of different attribute sections, and names of said sections and start addresses of said sections are displayed in the order of the addresses in said memory space.

6. A method of making a link directive file, the file being used for link processing/where a plurality of object files are linked into an execute form file to dispose instruction codes and variable data in a memory space and instruct said instruction codes and said variable data, the method comprising the step of comparing the size of the memory disposed in said memory space and the size of said instruction code or said variable data to be added or altered, and judging whether or not said instruction codes or said variable data can be disposed.

7. A method of making a link directive file, the file being used for link processing where a plurality of object files are linked into an execute form file to dispose instruction codes and variable data in a memory space, comprising the steps of:

reading memory disposition information from a device file containing at least address size information concerning each individual device;

reading said link directive file for instructing a disposition position of each constituent element of said object file;

visually displaying said memory disposition information and said link directive data on a display as a memory image; and altering contents of a part needed to be altered on said memory image referring to said memory image to alter said memory image.

8. A method of making a link directive file according to claim 7, wherein:

a memory image is displayed on the basis of default said directive information inherent to a device.

9. A method of making a link directive file according to claim 7, wherein:

memory information from said device file and directive data from said link directive file, and link directive data concerning an execute form from an execute form file are read to display on said display a memory image after the link processing.

10. A method of making a link directive file according to claim 7, wherein:

information of a part on said memory image is selected to display information of a lower hierarchy of said information.

11. A tool for making a link directive file, the file being used for link processing where a plurality of object files are linked into an execute form file to dispose instruction codes and variable data in a memory space, comprising:

memory disposition information storage means for storing therein memory disposition information containing at least address size information concerning each individual device;

link directive file data holding means for holding link directive file data for indicating a position where a constituent element of said object file is disposed in the execute form file;

memory image display means for displaying the memory image on the basis of said memory information held in said memory disposition information storage means and said link directive data held in said link directive file data holding means; and data edit means for altering contents of information of a part needed to be altered on said memory image with reference to said memory image to update said memory image.

12. A tool for making a link directive file according to claim 11, wherein:

there is provided link directive file read means for reading the link directive file.

13. A tool for making a link directive file according to claim 11, wherein:

there is provided execute form analysis means for reading the execute form file after subject to the link processing, analyzing constituent elements of the execute form file, and storing the link directive information in said link directive file data holding means.

14. A tool for making a link directive file according to claims 11, wherein:

said data edit means has a function in which partial information on said memory image is selected to display lower rank hierarchy information of said information.

15. A tool for making a link directive file according to claim 11, wherein:

there is provided default link directive file data holding means.

* * * * *